(12) United States Patent
Iihoshi et al.

(10) Patent No.: US 12,444,245 B2
(45) Date of Patent: Oct. 14, 2025

(54) MINE MANAGEMENT SYSTEM

(71) Applicant: HITACHI CONSTRUCTION MACHINERY CO., LTD., Tokyo (JP)

(72) Inventors: Yoichi Iihoshi, Tokyo (JP); Kenji Mizutani, Tokyo (JP); Kouichirou Ejiri, Tokyo (JP); Hiroshi Tsukui, Tokyo (JP); Kouji Otani, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 86 days.

(21) Appl. No.: 18/280,776

(22) PCT Filed: Apr. 11, 2022

(86) PCT No.: PCT/JP2022/017536
§ 371 (c)(1),
(2) Date: Sep. 7, 2023

(87) PCT Pub. No.: WO2023/013181
PCT Pub. Date: Feb. 9, 2023

(65) Prior Publication Data
US 2024/0304038 A1    Sep. 12, 2024

(30) Foreign Application Priority Data

Aug. 5, 2021 (JP) ................... 2021-128964

(51) Int. Cl.
*G07C 5/02* (2006.01)
(52) U.S. Cl.
CPC ...................... *G07C 5/02* (2013.01)
(58) Field of Classification Search
CPC ..... G07C 5/02; B60W 40/13; B60W 50/0205; B60W 2300/125; G06Q 50/02
See application file for complete search history.

(56) References Cited

U.S. PATENT DOCUMENTS

| | | | |
|---|---|---|---|
| 5,293,947 A | 3/1994 | Stratton | |
| 2005/0235865 A1* | 10/2005 | Kumar | B60L 50/53 105/61 |

(Continued)

FOREIGN PATENT DOCUMENTS

| | | |
|---|---|---|
| JP | 06-510418 A | 11/1994 |
| JP | 2008-133798 A | 6/2008 |

(Continued)

OTHER PUBLICATIONS

International Search Report of PCT/JP2022/017536 date Jun. 21, 2022.

(Continued)

*Primary Examiner* — Gertrude Arthur Jeanglaude
(74) *Attorney, Agent, or Firm* — Mattingly & Malur, PC

(57) ABSTRACT

The invention of the present application has an object of providing a mine management system capable of separately sensing an abnormality of a powertrain system and a load amount sensor of a mine dump truck. For this purpose, a mine management system for managing mine dump trucks operating in a mine includes a processing device that calculates and totalizes a productivity index of the mine dump trucks, in which the processing device: calculates consumed energy of the mine dump truck on the basis of at least a vehicle velocity of the mine dump truck, a road surface gradient, and a load amount; calculates input energy of the mine dump truck on the basis of at least one of a fuel injection amount, trolley electric power, and battery electric power of the mine dump truck; and determines presence or absence of an abnormality of a load amount sensor or a powertrain system of the mine dump truck on the basis of the consumed energy and the input energy.

10 Claims, 17 Drawing Sheets

(56) References Cited

U.S. PATENT DOCUMENTS

| | | | |
|---|---|---|---|
| 2009/0012673 | A1 | 1/2009 | Hori et al. |
| 2014/0244098 | A1 | 8/2014 | Ueda et al. |
| 2016/0247395 | A1 | 8/2016 | Sugihara et al. |
| 2018/0347479 | A1 | 12/2018 | Nakamura et al. |
| 2021/0164868 | A1* | 6/2021 | Wakao ................ B60C 23/0488 |
| 2021/0232137 | A1* | 7/2021 | Whitfield, Jr. ......... G05D 1/223 |

FOREIGN PATENT DOCUMENTS

| | | |
|---|---|---|
| WO | 2015/029229 A1 | 3/2015 |
| WO | 2017/081912 A1 | 5/2017 |

OTHER PUBLICATIONS

Extended European Search Report received in corresponding European Application No. 22852610.9 dated Jan. 16, 2025.
International Preliminary Report on Patentability received in corresponding International Application No. PCT/JP2022/017536 dated Feb. 15, 2024.

* cited by examiner

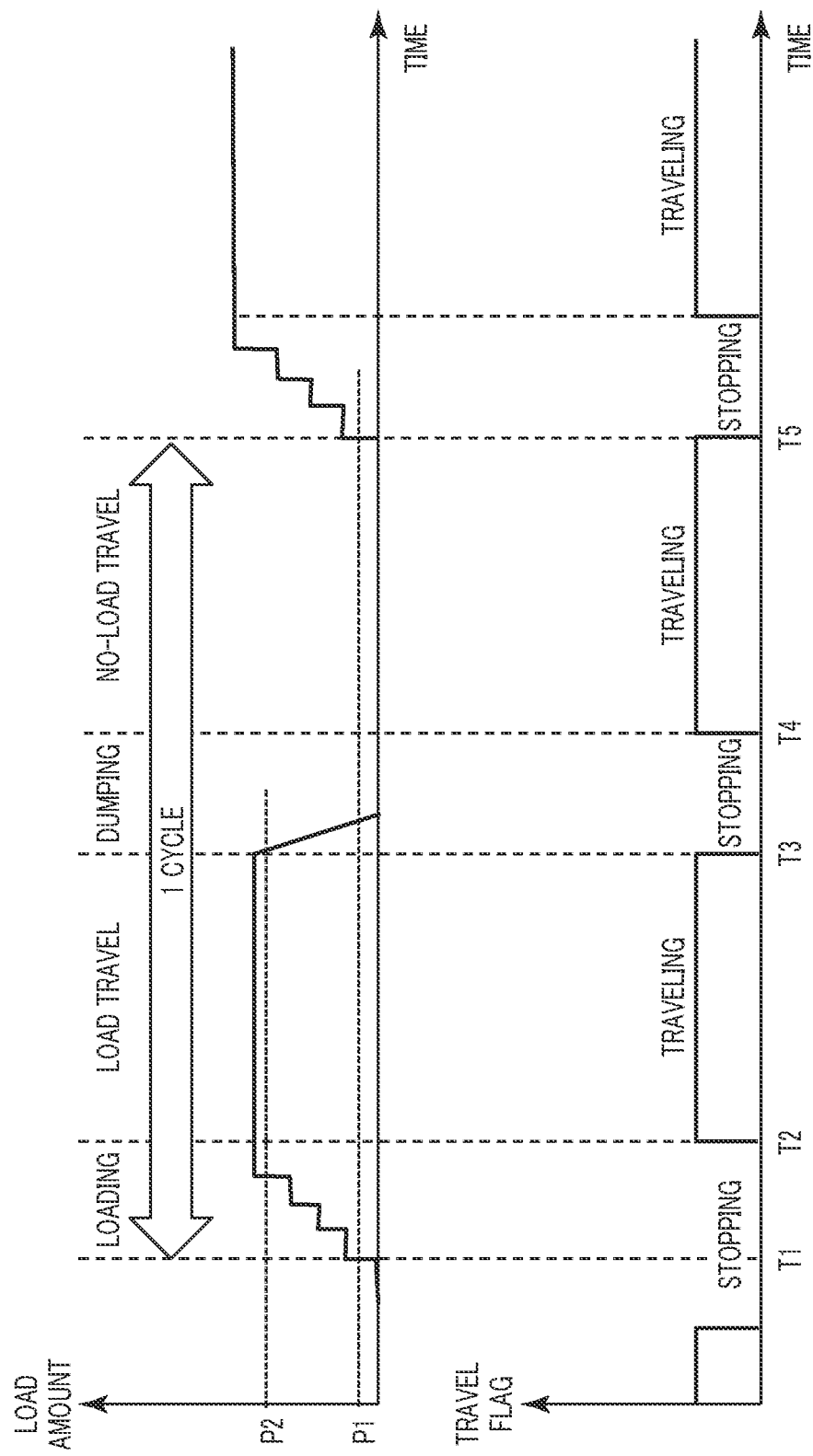

MINE MANAGEMENT SYSTEM

TECHNICAL FIELD

The present invention relates to a mine management system for managing mine dump trucks operating in a mine.

BACKGROUND ART

In recent years, there has been developed a system for collecting/analyzing data on mining machines thereby calculating various management indexes based on an operation situation of a specific section of a path from dumping to next dumping. As a prior art document which discloses such a system, for example, Patent Document 1 is known. In Patent Document 1, there is described a system and a method which calculate a production efficiency index and the like of a mining machine such as a fuel consumption amount per unit time or a load amount in a specific section in which links adjacent to each other on a path satisfy a predetermined condition.

PRIOR ART DOCUMENT

Patent Document

Patent Document 1: WO-2015-029229-A

SUMMARY OF THE INVENTION

Problem to be Solved by the Invention

However, in Patent Document 1, an increase in fuel consumption amount per unit time and a decrease in load amount can be detected for the section defined in advance, but a decrease in productivity in a section other than the defined section cannot be monitored. Moreover, the load amount used to calculate productivity indexes (a transport amount [T/L] per 1 litter of fuel and a transport amount [T/h] per unit time) is often calculated from a pressure of each suspension attached between a tire axle and a vehicle body of the dump truck. A device for calculating this load amount (load amount calculation device) is influenced by suspension oil and a change in tire pressure and hence requires calibration, but a method of executing the calibration at an appropriate timing is not sufficiently considered in related art.

The present invention has been made in view of the problem described above and has an object of providing a mine management system capable of separately sensing an abnormality of a powertrain system and an abnormality of a load amount sensor of a mine dump truck.

Means for Solving the Problem

In order to solve such a problem as described above, a mine management system for managing mine dump trucks operating in a mine, includes a processing device that calculates and totalizes a productivity index of the mine dump trucks, in which the processing device is configured to: calculate consumed energy of the mine dump truck on the basis of at least a vehicle velocity of the mine dump truck, a road surface gradient, and a load amount of the mine dump truck; calculate input energy of the mine dump truck on the basis of at least one of a fuel injection amount, trolley electric power, and battery electric power of the mine dump truck; and determine presence or absence of an abnormality of a load amount sensor or a powertrain system of the mine dump truck on the basis of the consumed energy and the input energy.

According to the present invention configured as described above, the abnormality of the powertrain system and the abnormality of the load amount sensor of the mine dump truck can separately be sensed. As a result, when the abnormality of the powertrain system of the mine dump truck is sensed, the productivity of the mine can be maintained/improved by executing maintenance/replacement of the powertrain system or reducing operation of this mine dump truck. Moreover, when the abnormality of the load amount sensor is sensed, the productivity of the mine can accurately be managed by calibrating the load amount sensor.

Advantages of the Invention

With the mine system according to the present invention, the abnormality of the powertrain system and the abnormality of the load amount sensor of the mine dump truck can separately be sensed.

BRIEF DESCRIPTION OF THE DRAWINGS

FIG. 3 is a graph for showing a state change in the mine dump truck.

MODES FOR CARRYING OUT THE INVENTION

A description is now given of embodiments of the present invention with reference to the drawings.

First Embodiment

With reference to FIG. 1 to FIG. 12, a description is given of a mine management system according to a first embodiment of the present invention.

Figure 1:
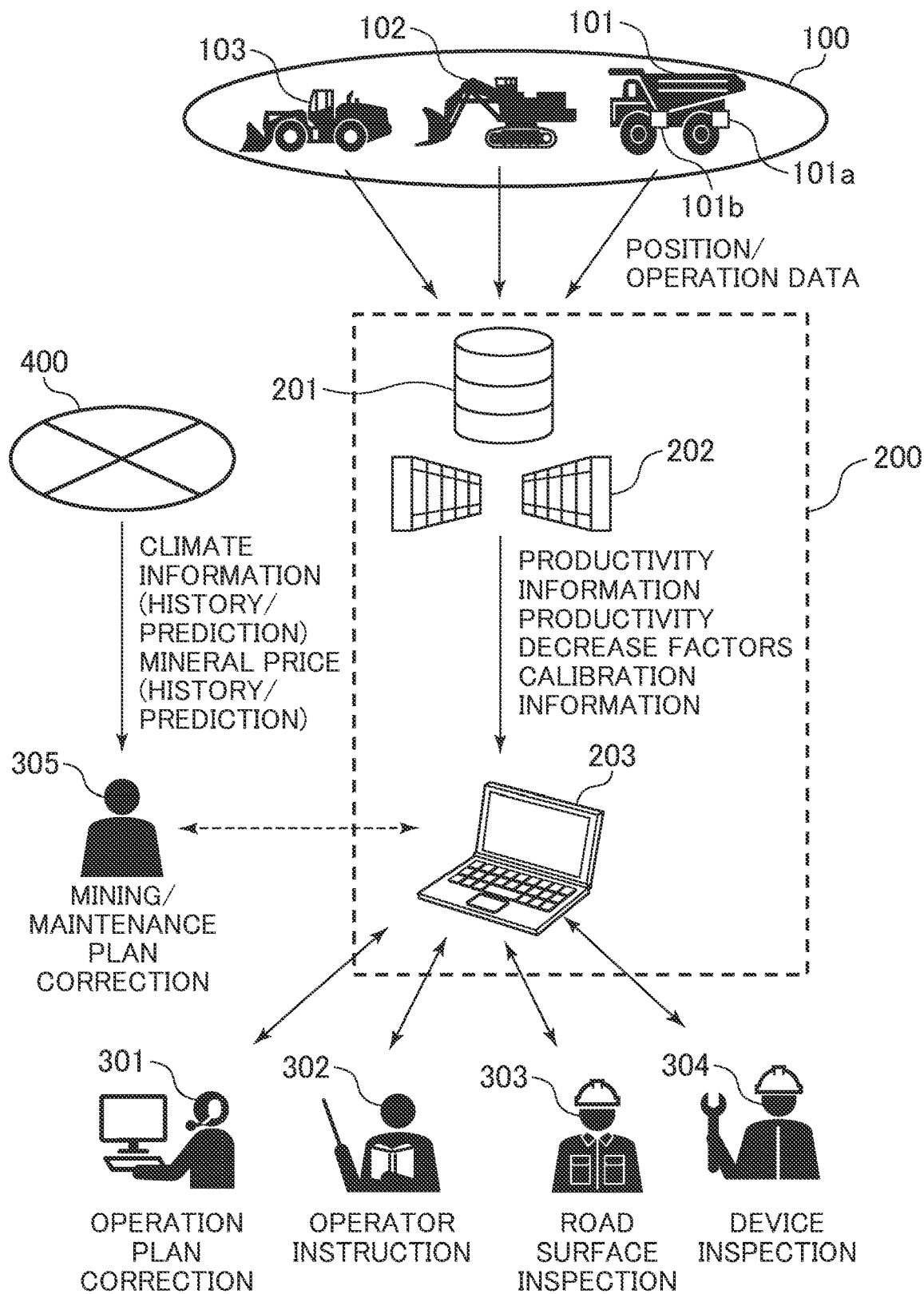
FIG. 1 is a view for showing a whole image of a mine management system.

FIG. 1 is a view for showing a whole image of the mine management system according to the present embodiment. The mine management system 200 includes a storage device 201 (for example, a database) which aggregates position information and operation information from each of a plurality of mining machines (mine dump trucks 101, excavators 102, bulldozers 103, and the like) which travel in the same mine area 100 and are managed together, a processing device 202 (for example, a server) which calculates a productivity index of the mine on the basis of the position information and the operation information on each of the mining machines 101 to 103 and discriminates calibration information on a load amount sensor 101a provided to the mine dump truck 101 and productivity decrease factors such as an abnormality of a powertrain system of the mine dump truck 101, and a display terminal device 203 (for example, a laptop personal computer or a mobile terminal) which displays, in a dashboard form, the productivity index, the productivity decrease factors, the calibration information, and the like. In this configuration, it is desired that the operation data on each of the mining machines 101 to 103 be successively transmitted to the mine management system 200, but, in consideration of a communication situation and a communication cost, the operation data is not always successively transmitted. Thus, it is assumed that the processing device 202 in the present embodiment starts processing after operation data in an amount accumulated to a certain degree has been buffered. The amount accumulated to a certain degree can be determined by, for example, a time corresponding to the past longest cycle from loading to next loading or a data amount corresponding to the longest cycle.

A user of the mine management system 200 can maintain/manage productivity of the mine by using the information displayed on the display terminal device 203 (dashboard information) to early detect a productivity decrease of the mine thereby taking a countermeasure based on a decrease factor of the productivity. For example, an operation planner 301 of the mine uses the dashboard information thereby being capable of correcting an operation plan for each mine dump truck 101. An operator instructor 302 finds, from the dashboard information, an operator whose operation is to be improved thereby being capable of providing an operation guidance. A road surface maintenance person 303 early identifies a road surface location leading to the productivity decrease from the dashboard information thereby being capable of executing repairment. A device maintenance person 304 detects a powertrain system abnormality of the mine dump truck 101 from the dashboard information thereby being capable of informing a component dealer to prepare a required component in advance. Moreover, by combining climate information (history/prediction) and a mineral price (history/prediction) acquired via the Internet 400 with the dashboard information, it is possible to issue a correction instruction for a mining/maintenance plan to a mining responsible person 305 and an improvement instruction for preventing the productivity decrease to the operation planner 301, the operator instructor 302, the road surface maintenance person 303, and the device maintenance person 304. Note that a display form of the display terminal device 203 is not limited to the dashboard form and may be a report form or a mail form.

Figure 2A:
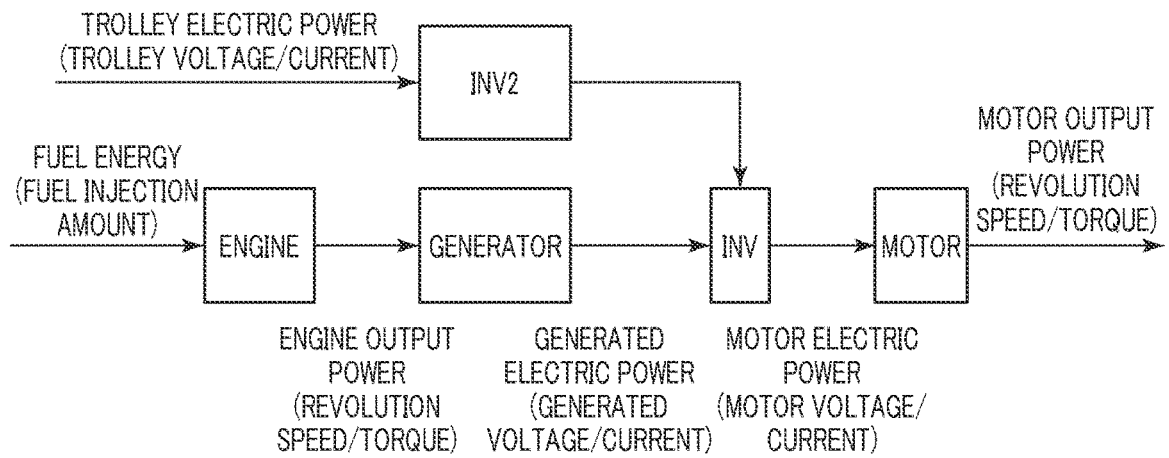
FIG. 2A is a diagram for showing a configuration example of a powertrain system of a mine dump truck.
Figure 2B:
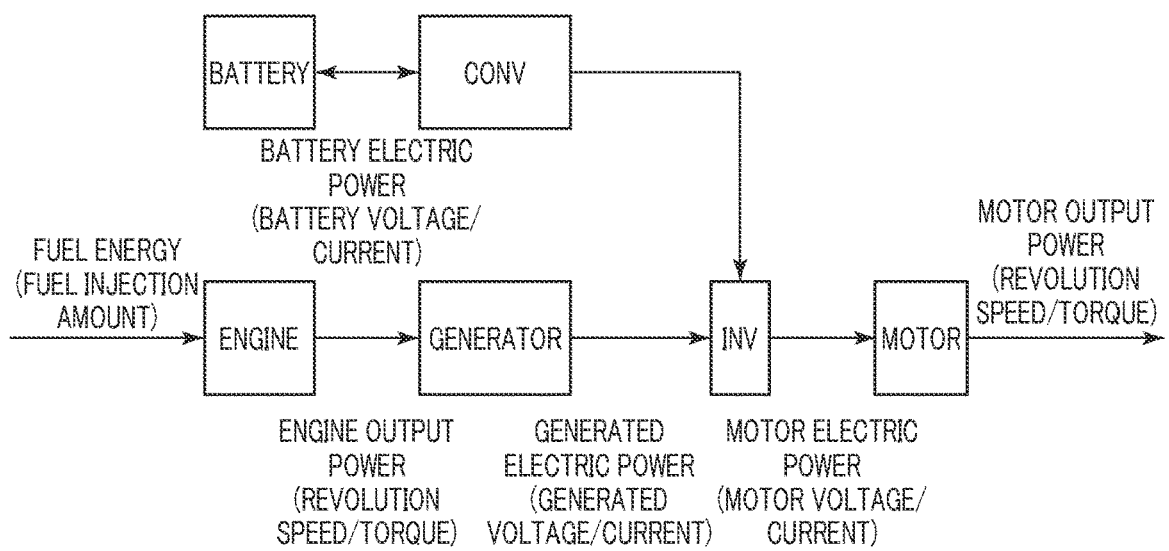
FIG. 2B is a diagram for showing a configuration example of the powertrain system of the mine dump truck.
Figure 2C:
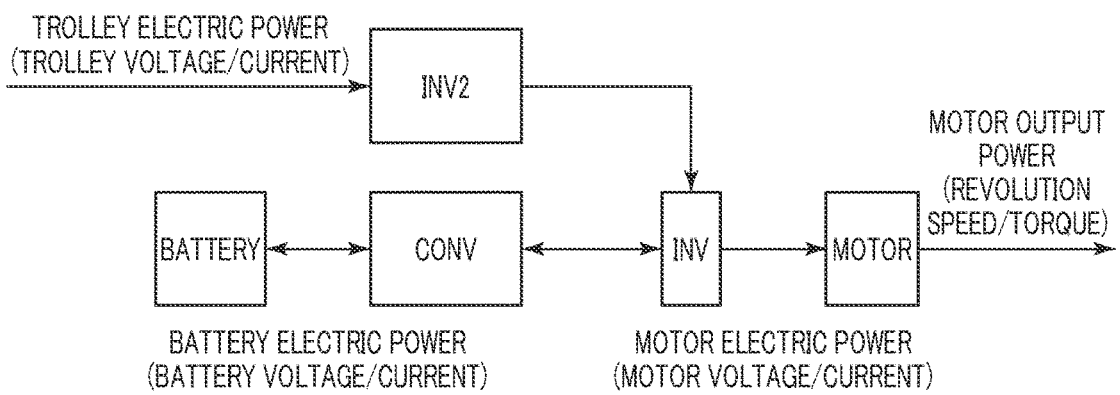
FIG. 2C is a diagram for showing a configuration example of the powertrain system of the mine dump truck.

FIG. 2A to FIG. 2C are diagrams for showing configuration examples of the powertrain system of the mine dump truck 101. In the configuration of FIG. 2A, electric power generated by a generator driven by an engine or electric power received from a trolley is supplied to a motor. The configuration of FIG. 2B is of a hybrid type in which a battery and a CONV (converter) are installed and electric power generated by a generator driven by an engine or electric power of the battery is supplied to a motor. The configuration of FIG. 2C is of an electric drive type in which a battery is installed in place of the engine, and electric power of the battery or electric power received from a trolley is supplied to the motor. Each of the component devices (the engine, the generator, the INV (inverter), and the motor) in the powertrain system can be determined to be abnormal when efficiency calculated from input/output values of each component device falls below a threshold value set in advance. In a description given now, an abnormality detection method for the configuration of FIG. 2A is described, but the abnormality detection can be executed also for the configuration of FIG. 2B or FIG. 2C in a similar approach.

FIG. 3 is a graph for showing a state change in the mine dump truck 101. In FIG. 3, a load weight (load amount) of transported ore calculated by the load amount calculation device is shown on an upper row and a result (travel flag) of determination whether the mine dump truck 101 is traveling or stopping based on a vehicle velocity sensed by the vehicle velocity sensor 101b is shown on a lower row. The load amount calculation device is formed of a load amount sensor 101a provided to the suspension of the mine dump truck 101 and an in-vehicle controller (not shown) which calculates the load amount from a sensed value of the load amount sensor 101a in a predetermined vehicle state.

As shown in FIG. 3, a travel cycle (hereinafter referred to as cycle) of the mine dump truck 101 is roughly divided into four states which are a state of loading a load (loading), a state of travel with a load (load travel), a state of unloading the load (dumping), and a state of travel without load (no-load travel). An example of the state determination method is now described. A predetermined value P1 is a threshold value for determining whether or not the state is the loading state and it is determined that the state is the loading state at a timing (T1) at which the load amount exceeds the predetermined value P1 during the stopping. After the state is determined to be the loading state, the state is determined to be the load travel state at a timing (T2) at which the travel flag changes from stopping to traveling and the state is determined to be the dumping state at a timing (T3) at which the load amount falls below a predetermined value P2 during the stop. After that, the state is determined to be the no-load travel state at a timing (T4) at which the travel flag changes to the traveling and the state is determined to the load state at a timing (T5) at which the load amount again exceeds the predetermined value P1 during the stopping. By repeating such processing, the cycle and the four states (loading, load travel, dumping, and no-load travel) of the mine dump truck 101 can be determined. In the present embodiment, the productivity index (for example, the transport amount [T/L] per 1 litter of the fuel) is calculated in each cycle of the mine dump truck 101 and operation data for the abnormality determination is totalized for each state. Moreover, in the present embodiment, for the convenience of description, the loading to the next loading is defined as one cycle, but the cycle can start at any state as long as the cycle includes the four states (the loading, the load travel, the dumping, and the no-load travel).

Figure 4:
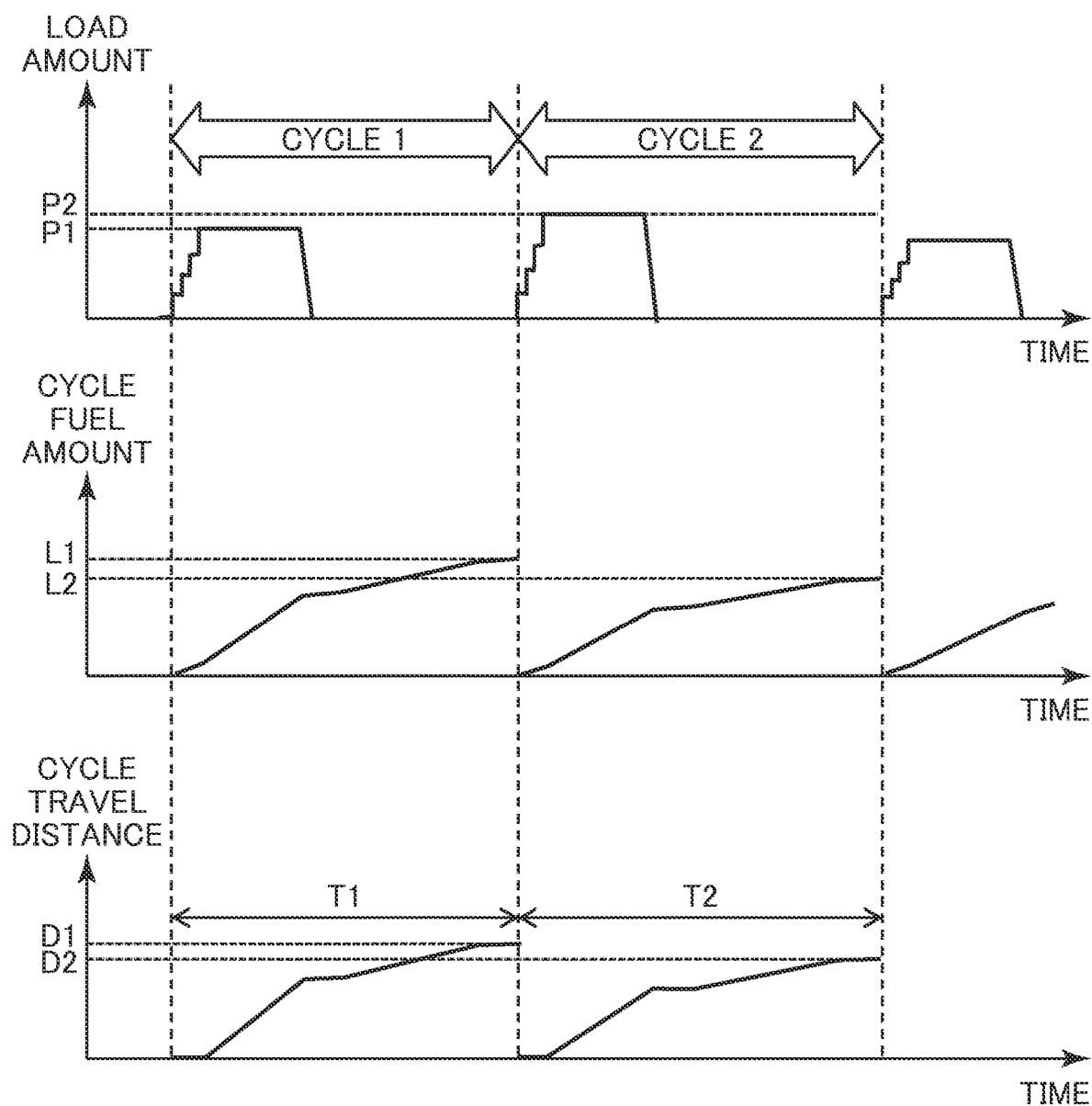
FIG. 4 is a graph for showing a totalization example of operation data on the mine dump truck.

FIG. 4 is a graph for showing a totalization example of the operation data on the mine dump truck 101. In FIG. 4, the load amount calculated by the load amount calculation device is shown on an upper row, a cycle fuel obtained by accumulating an engine injection amount in each cycle is shown on a middle row, and a cycle travel distance obtained by accumulating the vehicle velocity in each cycle is shown on a lower row. In FIG. 4, the load amount in a cycle 1 is P1, the load amount in a cycle 2 is P2, the fuel amount in the cycle 1 is L1, the fuel amount in the cycle 2 is L2, the travel distance in the cycle 1 is D1, the travel distance in the cycle 2 is D2, the travel time in the cycle 1 is T1, and the travel time in the cycle 2 is T2. The productivity index [T/L] in the cycle 1 is obtained as P1/L1 and the productivity index [T/L] in the cycle 2 is obtained as P2/L2. However, it is difficult to compare them with each other when the cycle travel distances D1 and D2 or the cycle travel time S1 and S2 are different from each other. Moreover, the productivity index [T/L] changes greatly when the travel path (particularly the distance of an uphill path) changes for the same travel distance and changes according to a way of driving (acceleration/deceleration), road surface roughness, and the like such as an excavator loading time in each cycle even for the same path. Thus, it is difficult to obtain knowledge which is used to manage the productivity and leads to maintenance/improvement thereof only by simply calculating the productivity index [T/L] in each cycle. Thus, in the present embodiment, in addition to the productivity index [T/L], the productivity is accurately managed/maintained by calculating efficiency by state described later.

Figure 5:
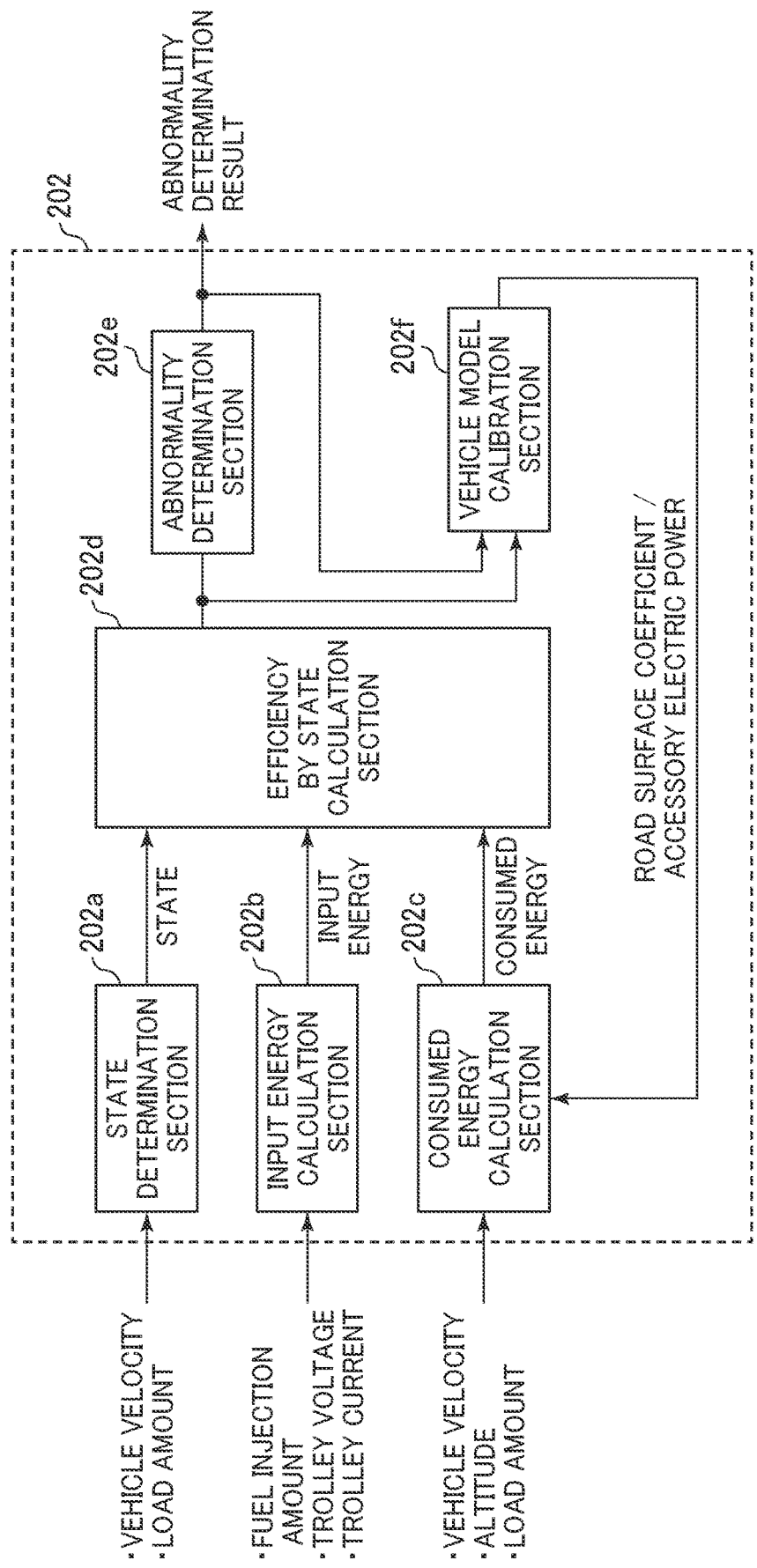
FIG. 5 is a diagram for showing an example of function blocks of a processing device.

FIG. 5 is a diagram for showing an example of a function block diagram of the processing device 202. The processing device 202 includes a state determination section 202a, an input energy calculation section 202b, an consumed energy calculation section 202c, an efficiency-by-state calculation section 202d, an abnormality determination section 202e, and a vehicle model calibration section 202f. The processing device 202 is formed of a controller which has a computation processing function, an input/output interface which executes input/output of signals from/to external devices, and the like and implements a function of each section by executing a program stored in a storage device such as a ROM.

The state determination section 202a determines the state of the mine dump truck 101 on the basis of the vehicle velocity and the load amount through the method described in FIG. 3. Note that input signals to the state determination section 202a are different according to the state of the mine dump truck 101 to be determined. For example, in order to discriminate, for example, the trolley driving state, a trolley voltage and the like is required to input.

The input energy calculation section 202b calculates input energy [kW/h] to the mine dump truck 101 from energy input (the fuel injection amount, the trolley voltage, a trolley current, and the like) to the powertrain system. The input energy is, for example, a sum of an engine heat amount (fuel injection amount*fuel heat generation amount) and trolley electric power (trolly voltage*trolley current).

The consumed energy calculation section 202c calculates consumed energy [kW/h] from the vehicle velocity, the altitude, and the load amount through a method described later.

The efficiency-by-state calculation section 202d calculates efficiency by state in each of predetermined states (the cycle, the no-load operation, the load operation, and the like).

The abnormality determination section 202e detects the abnormality separately in the powertrain system and the load amount sensor 101a on the basis of the efficiency by state through a method described later.

The vehicle model calibration section 202f corrects a road surface coefficient and accessory electric power (parameters of the vehicle model used to calculate the consumed energy) such that each piece of efficiency by state falls within a predetermined range when the abnormality determination section 202e is not determining that the load amount sensor 101a and the powertrain system are abnormal. With this configuration, robust abnormality determination can be achieved against changes in the road surface coefficient and the accessory electric power which are greatly influenced by an environment (the climate and the like) of the mine and it is possible to accurately calculate the productivity index in each cycle by executing inspection or calibration of the load amount sensor 101a at the timing at which the load amount sensor 101a is determined to be abnormal.

Figure 6:
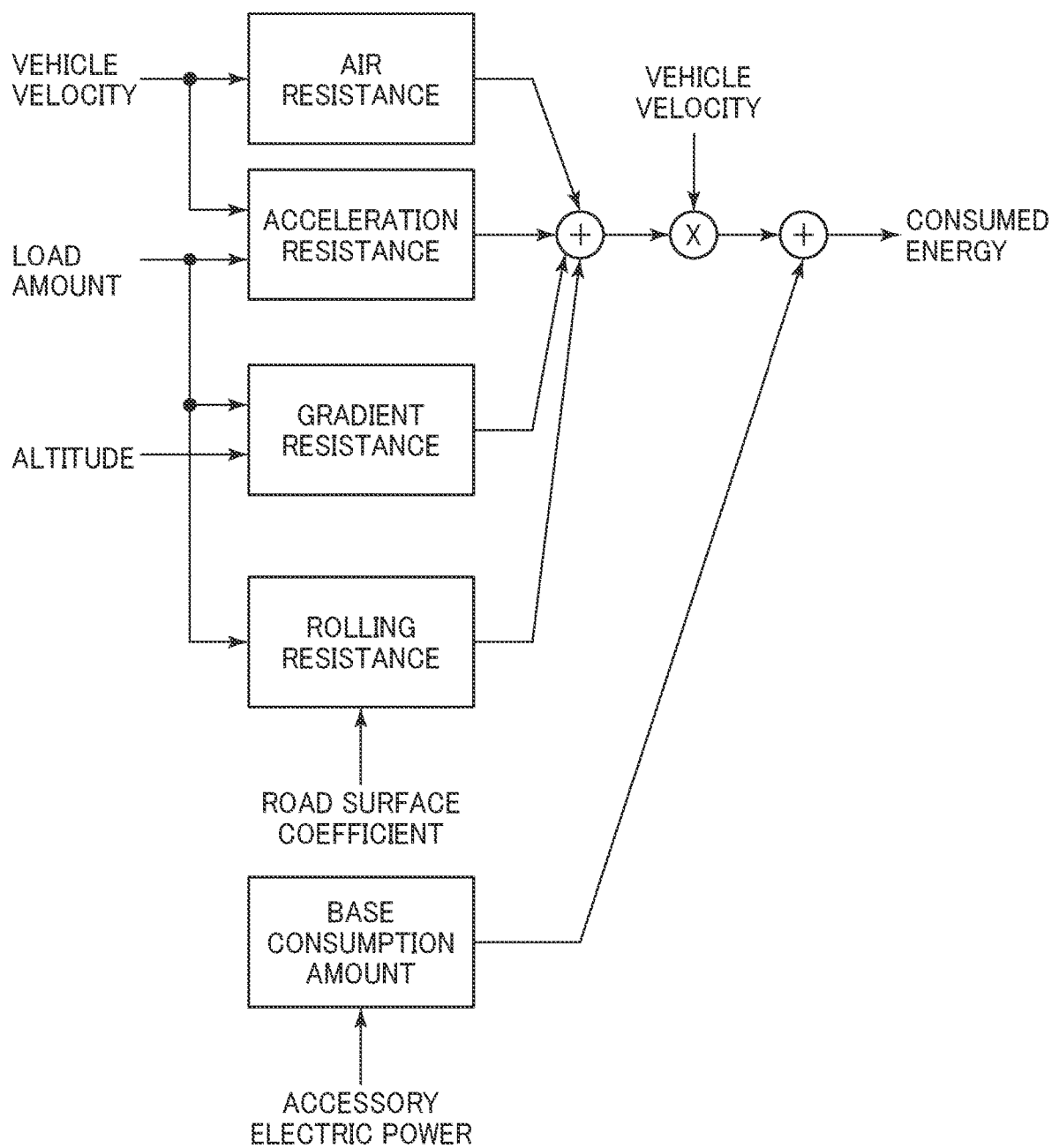
FIG. 6 is a diagram for showing an example of a consumed energy calculation method through use of a vehicle model.

FIG. 6 is a diagram for showing an example of the consumed energy calculation method through use of the vehicle model. The consumed energy at the time of the vehicle travel is obtained by multiplying a sum of an air resistance, an acceleration resistance, a gradient resistance, and a rolling resistance by the vehicle velocity and adding a base consumption amount required for an engine idling operation and accessories such as an air cooling fan, cabin air conditioning, and the like. In this state, consumed energy corresponding to an actual operation situation can be calculated by acquiring the vehicle velocity, the load amount, and the altitude from vehicle operation data. Note that the air resistance also depends on the air density which changes according to the climate, but the influence of the air resistance is low compared with the rolling resistance and the base consumption amount and the air resistance is assumed to be a value which is determined according to only the vehicle velocity. Moreover, the gradient resistance is obtained from a vehicle body overall weight which is a sum of a vehicle body weight and the load amount and the road surface gradient. The present embodiment is configured to obtain the road surface gradient from a temporal change in altitude, but may be obtained from an inclination angle of the vehicle body when an inclination angle sensor is provided to the vehicle body.

In addition to the computation described above, in order to further improve the accuracy of the consumed energy estimation, the road surface coefficient serving as a parameter used to calculate the rolling resistance and the accessory electric power serving as a parameter used to calculate the base consumption amount are calibrated at a suitable time through a method described later on the basis of the actual operation data. The consumed energy can be calculated independently of the model of the mine dump truck 101 by using the vehicle model as described above.

Figure 7:
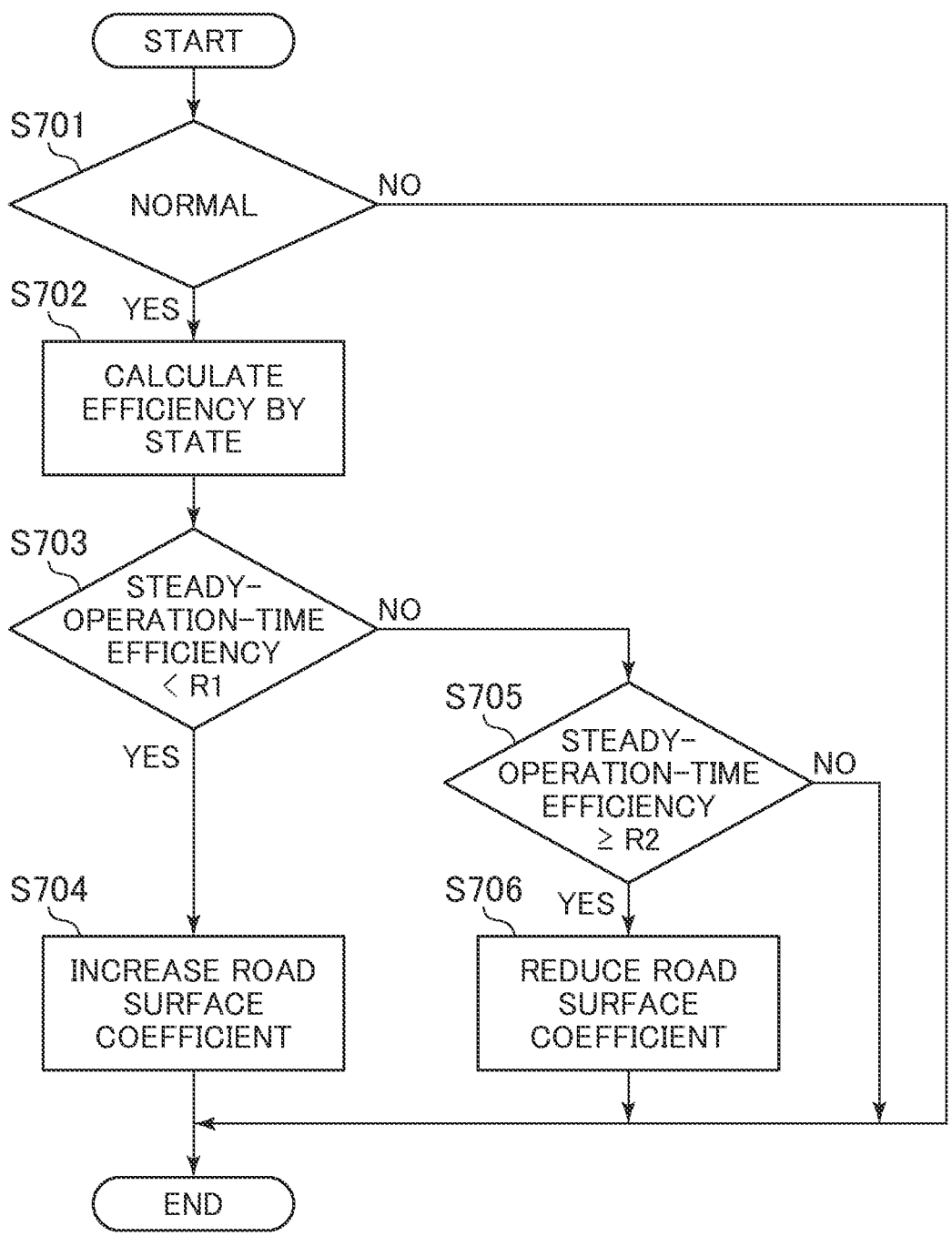
FIG. 7 is a flowchart for showing an example of processing executed when a vehicle model calibration section corrects a road surface coefficient.

FIG. 7 is a flowchart for showing an example of processing executed when the vehicle model calibration section 202f corrects the road surface coefficient. Each step is sequentially described now.

The vehicle model calibration section 202f first determines whether or not each of the load amount sensor 101a and the powertrain system is normal (Step S701). When a determination of NO (the load amount sensor 101a or the powertrain system is abnormal) is made in Step S701, the vehicle model calibration section 202f finishes this flow.

When a determination of YES (the load amount sensor 101a and the powertrain system are normal) is made in Step S701, the vehicle model calibration section 202f calculates the efficiency by state (steady-operation-time efficiency) in an operation region in which the efficiency of the powertrain system is substantially constant (Step S702). The steady-operation-time efficiency is the efficiency by state calculated in a state in which the vehicle is traveling at a constant velocity (in a state in which the acceleration resistance is substantially absent) and, in the present embodiment, the road surface coefficient in an entire region of the mine is corrected by using the efficiency by state at a uphill load operation time or a trolley operation time for the sake of simplicity, but a predetermined path or a predetermined zone may be discriminated through the GPS coordinates, and the road surface coefficient may be corrected for each discriminated path or zone.

Subsequently to Step S702, the vehicle model calibration section 202f determines whether or not the steady-operation-time efficiency is lower than a predetermined value R1 (the minimum efficiency estimated at the steady operation time) (Step S703). When a determination of YES (the steady-operation-time efficiency is lower than the predetermined value R1) is made in Step S703, the vehicle model calibration section 202f corrects the road surface coefficient to an increase side (Step S704) and finishes this flow.

When a determination of NO (the steady-operation-time efficiency is equal to or higher than the predetermined value R1) is made in Step S703, the vehicle model calibration section 202f determines whether or not the steady-operation-time efficiency is equal to or higher than a predetermined value R2 (the maximum efficiency estimated at the steady operation time) (Step S705). When a determination of NO (the steady-operation-time efficiency is lower than the predetermined value R2) is made in Step S705, the vehicle model calibration section 202f finishes this flow. When a determination of YES (the steady-operation-time efficiency is equal to or higher than the predetermined value R2) is made in Step S705, the vehicle model calibration section 202f corrects the road surface coefficient to a decrease side and finishes this flow.

As described above, the robust abnormality determination can be achieved against the change in road surface state due to the climate and the like by determining that the road surface situation has deteriorated thereby increasing the road surface coefficient when the efficiency at the steady operation time falls below the minimum efficiency R1 estimated in advance and determining that the road surface situation has recovered thereby reducing the road surface coefficient when the efficiency at the steady operation time is equal to or higher than the maximum efficiency R2 estimated in advance. Note that an excessive correction of the consumed energy caused by the road surface coefficient may be prevented by providing an upper limit value and a lower limit value for the road surface coefficient.

Figure 8:
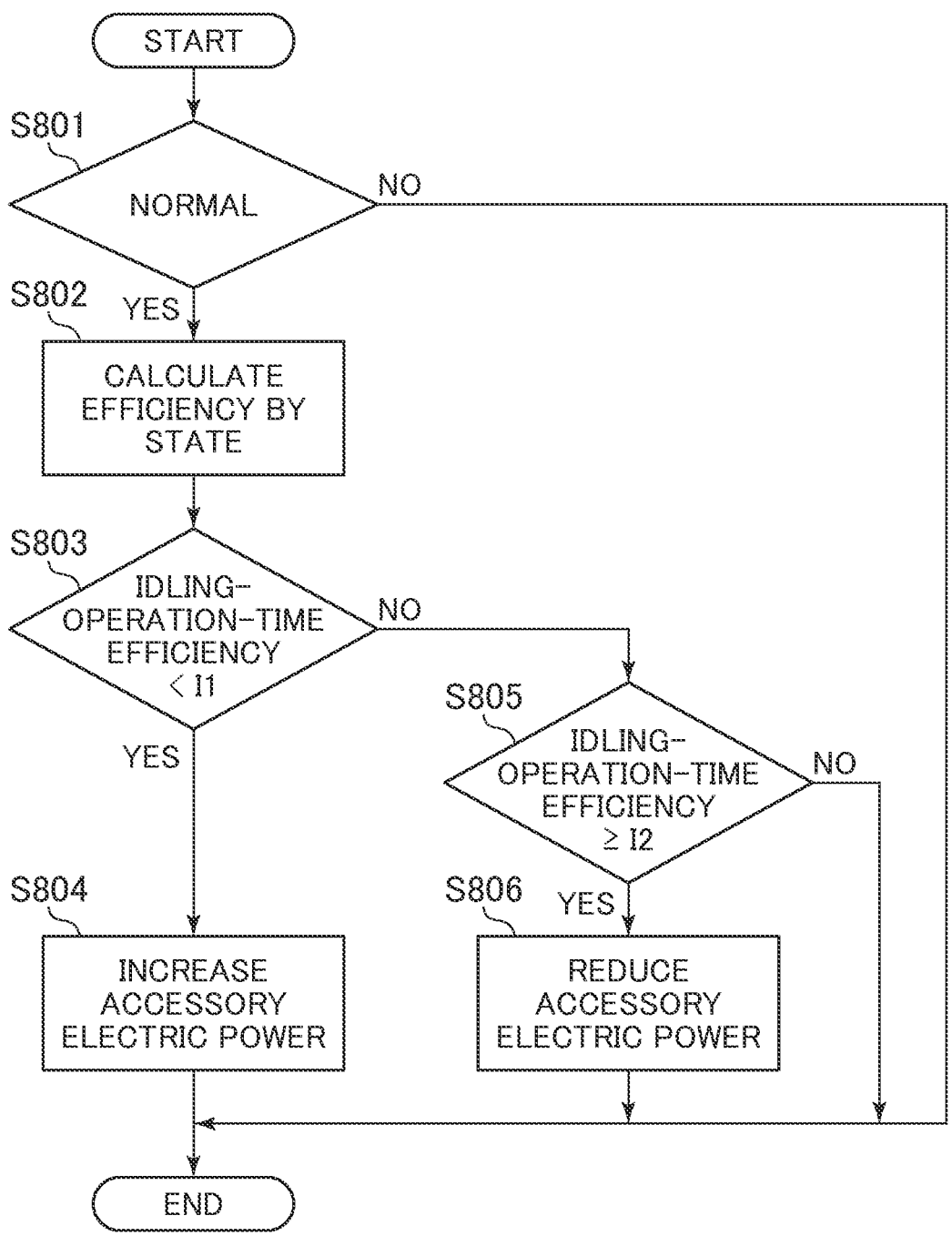
FIG. 8 is a flowchart for showing an example of processing executed when the vehicle model calibration section corrects accessory electric power.

FIG. 8 is a flowchart for showing an example of processing executed when the vehicle model calibration section 202f corrects the accessory electric power. Each step is sequentially described now.

The vehicle model calibration section 202f first determines whether or not each of the load amount sensor 101a and the powertrain system is normal (Step S801). When a determination of NO (the load amount sensor 101a or the powertrain system is abnormal) is made in Step S801, the vehicle model calibration section 202f finishes this flow.

When a determination of YES (the load amount sensor 101a and the powertrain system are normal) is made in Step S801, the vehicle model calibration section 202f calculates the efficiency by state (idling-operation-time efficiency) at the idling operation time at which the power consumption by the accessories is dominant (Step S802).

Subsequently to Step S802, the vehicle model calibration section 202f determines whether or not the idling-operation-time efficiency is lower than a predetermined value I1 (the minimum efficiency estimated at the idling operation time) (Step S803). When a determination of YES (the idling-operation-time efficiency is lower than the predetermined value I1) is made in Step S803, the vehicle model calibration section 202f corrects the accessory electric power to an increase side (Step S804) and finishes this flow.

When a determination of NO (the idling-operation-time efficiency is equal to or higher than the predetermined value I1) is made in Step S803, the vehicle model calibration section 202f determines whether or not the idling-operation-time efficiency is equal to or higher than a predetermined value I2 (the maximum efficiency estimated at the idling operation time) (Step S805). When a determination of NO (the idling-operation-time efficiency is lower than the predetermined value I2) is made in Step S805, the vehicle model calibration section 202f finishes this flow. When a determination of YES (the idling-operation-time efficiency is equal to or higher than the predetermined value I2) is made in Step S805, the vehicle model calibration section 202f corrects the accessory electric power to a decrease side (Step S805) and finishes this flow.

As described above, the robust abnormality determination can be achieved against the fluctuation of the electric power of the accessories in which loads greatly change according to the environment, by increasing the accessory electric power when the efficiency at the idling operation time falls below the minimum efficiency I1 estimated in advance and reducing the accessory electric power when the efficiency at the idling operation time is equal to or higher than the maximum efficiency I2 estimated in advance.

Figure 9:
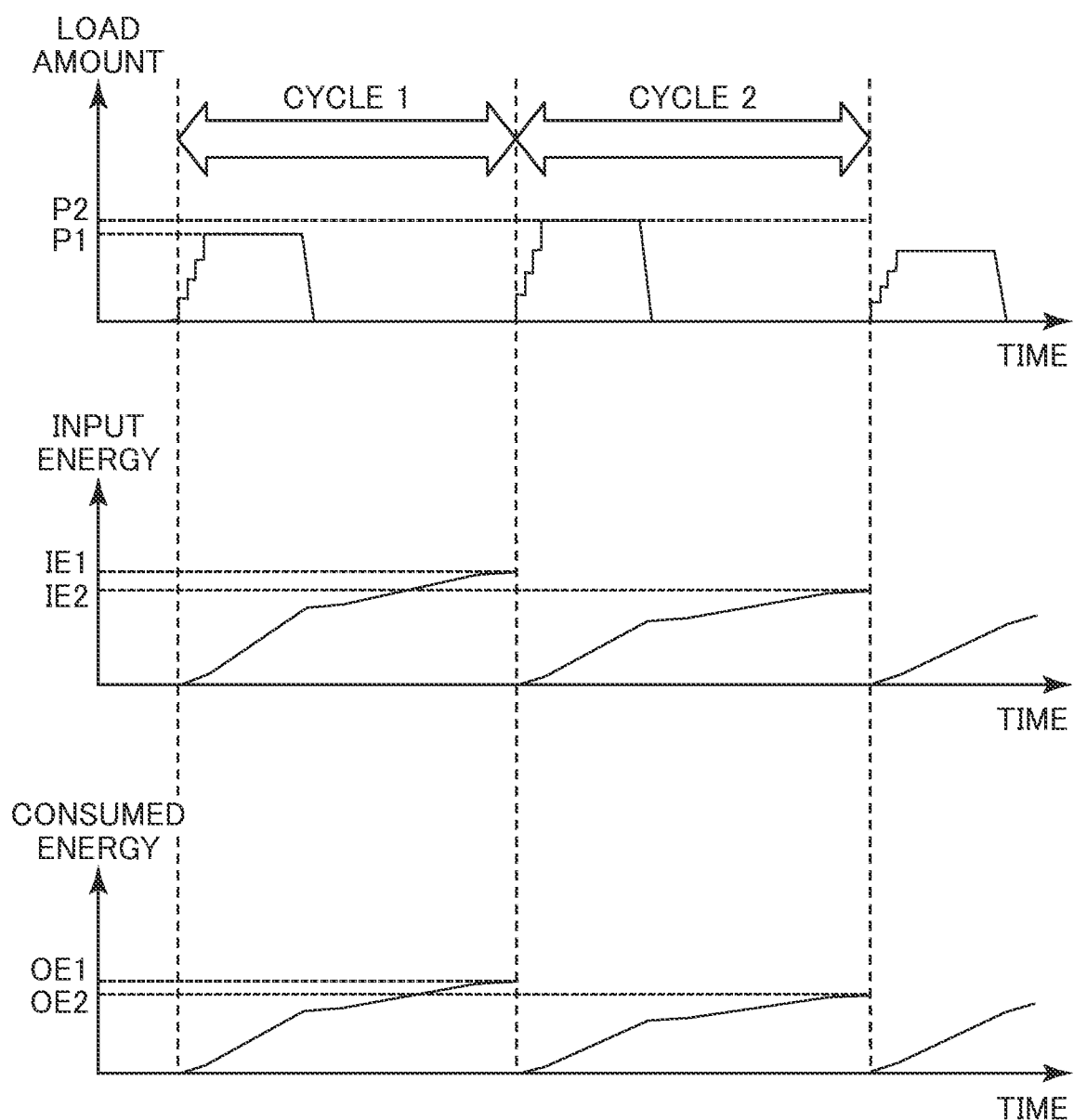
FIG. 9 is a graph for showing an example of a method of calculating efficiency in each cycle from the operation data on the mine dump truck.

FIG. 9 is a graph for showing an example of a method of calculating the efficiency in each cycle from the operation data on the mine dump truck 101. In FIG. 9, the load amount is shown on an upper row, the input energy is shown on a middle row, and the consumed energy is shown on a lower row. The predetermined values P1 and P2 of the load amount are as described in FIG. 4. The input energy is a value obtained by accumulating the engine input heat amount (fuel injection amount*fuel heat generation amount) and the trolley electric power (trolly voltage*trolley current) of the mine dump truck 101 in each cycle. The consumed energy is calculated through use of the vehicle model described in FIG. 6. The efficiency by cycle is calculated as consumed energy/input energy at an end time of each cycle, the efficiency in the cycle 1 in the graph is OE1/IE1, and the efficiency in the cycle 2 is OE2/IE2. The vehicle model described before is robust against the operation situation and the climate situation and the abnormality determination can be made regardless of who travels on which path in what way on the basis of this efficiency by cycle.

Figure 10:
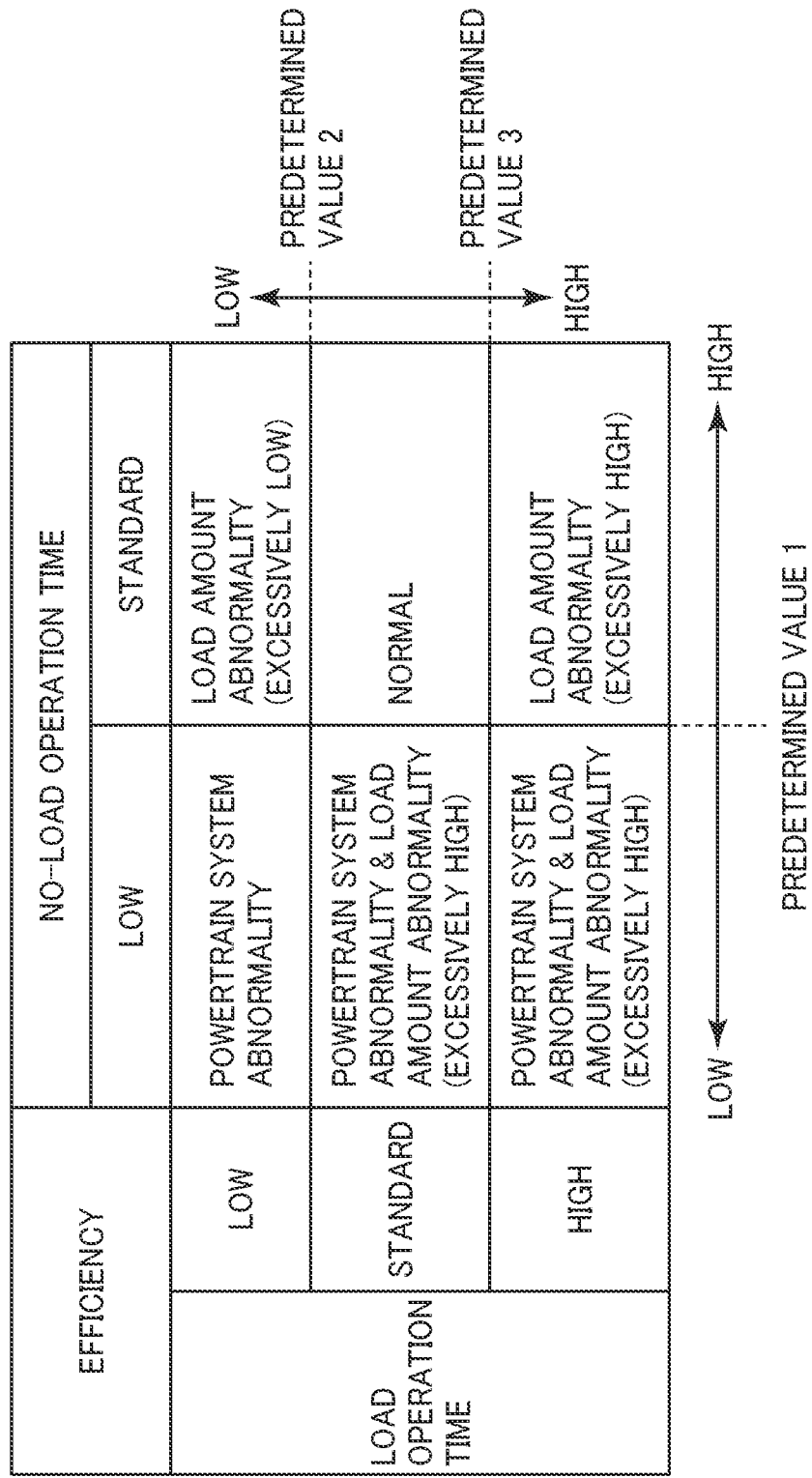
FIG. 10 is a table for showing an example of a relationship between no-load operation time efficiency and load operation time efficiency, and a powertrain system abnormality and a load amount sensor abnormality.

FIG. 10 is a table for showing an example of a relationship between the no-load operation time efficiency and the load operation time efficiency, and the powertrain system abnormality and the load amount sensor abnormality. In the present embodiment, the efficiency at the no-load operation time is determined to be low when the efficiency at the no-load operation time is lower than a predetermined value 1 (the minimum efficiency estimated at the no-load operation time) and the efficiency at the no-load operation time is determined to be standard when the efficiency at the no-load operation time is equal to or higher than the predetermined value 1. Moreover, the load operation time efficiency is determined to be low when the load operation time efficiency is lower than a predetermined value 2 (the minimum efficiency estimated at the load operation time), the load operation time efficiency is determined to be standard when the load operation time efficiency is equal to or higher than the predetermined value 2 and lower than a predetermined value 3, and the load operation time efficiency is determined to be high when the load operation time efficiency is equal to or higher than the predetermined value 3.

As shown in FIG. 10, when the efficiency at the no-load operation time is low, it is determined that the powertrain system is abnormal. Moreover, when the load operation time efficiency is standard or high in this state, it is determined that an excessively high load amount is sensed due to the abnormality of the load amount sensor 101a. This reflects such a phenomenon that the efficiency at the no-load operation time decreases due to the powertrain system abnormality while the calculated consumed energy is larger than the actual consumed energy due to the excessively high sensed load amount and hence the efficiency at the load operation time increases.

In the case in which the no-load operation time efficiency is standard, when the load operation time efficiency is low, it is determined that the load amount is detected as excessively small due to the abnormality of the load amount sensor 101a, when the load operation time efficiency is standard, the powertrain system is determined as normal, and when the load operation efficiency is high, it is determined that the load amount is detected as excessively high due to the abnormality of the load amount sensor 101a. In this configuration, it is only required that the predetermined value 1 and the predetermined value 2 are substantially the same values (note that it is desired that the predetermined value 2 is slightly higher than the predetermined value 1 by an amount corresponding to higher efficiency of the powertrain system at the load operation time than that at the no-load operation time) and it is only required to set the predetermined value 3 to a value (for example, the maximum efficiency of the powertrain system) higher than the predetermined value 1 or the predetermined value 2.

Figure 11:
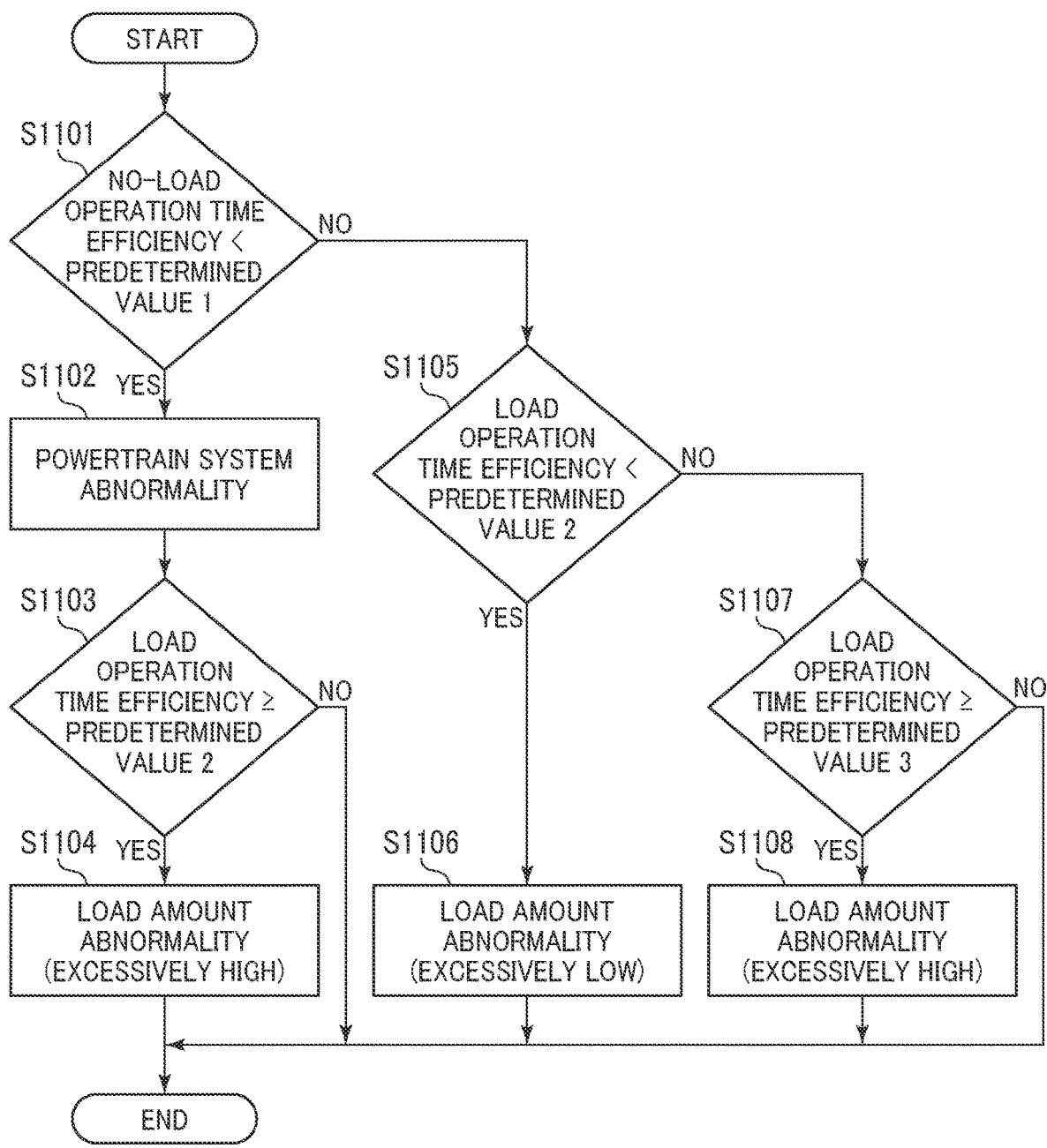
FIG. 11 is a flowchart for showing an example of processing of an abnormality determination section.

FIG. 11 is a flowchart for showing an example of processing of the abnormality determination section 202e. Each step is sequentially described now.

The abnormality determination section 202e first determines whether or not the efficiency by state at the no-load operation time (no-load operation time efficiency) is lower than the predetermined value 1 (Step S1101).

When a determination of YES (the no-load operation time efficiency is lower than the predetermined value 1) is made in Step S1101, the abnormality determination section 202e notifies the device maintenance person 304 of the abnormality of the powertrain system (Step S1102). At this time, the abnormality determination section 202e may notify the operation planner 301 that the use of this vehicle is to be avoided.

Subsequently to Step S1102, the abnormality determination section 202e determines whether or not the efficiency by state at the load operation time (load operation time efficiency) is equal to or higher than the predetermined value 2 (Step S1103). When a determination of NO (the load operation time efficiency is lower than the predetermined value 2) is made in Step S1103, the abnormality determination section 202e finishes this flow.

When a determination of YES (the load operation time efficiency is equal to or higher than the predetermined value 2) is made in Step S1103, the abnormality determination section 202e determines that the excessively high load amount is sensed due to the abnormality of the load amount sensor 101a, excludes the productivity index calculated during this abnormality from the totalization processing, and notifies the device maintenance person 304 that the load amount sensor 101a is to be calibrated or remotely instructs the mine dump truck 101 to calibrate the load amount sensor 101a (Step S1104).

When a determination of NO (the no-load operation time efficiency is equal to or higher than the predetermined value 1) is made in Step S1101, the abnormality determination section 202e determines whether or not the load operation time efficiency is lower than the predetermined value 2 (Step S1105).

When a determination of YES (the load operation time efficiency is lower than the predetermined value 2) is made in Step S1105, the abnormality determination section 202e determines that the excessive low load amount is detected due to the abnormality of the load amount sensor 101a, excludes the productivity index calculated during this abnormality from the totalization processing, and notifies the device maintenance person 304 that the load amount sensor 101a is to be calibrated or remotely instructs the mine dump truck 101 to calibrate the load amount sensor 101a (Step S1106).

When a determination of NO (the load operation time efficiency is equal to or lower than the predetermined value 2) is made in Step S1105, the abnormality determination section 202e determines whether or not the load operation time efficiency is equal to or higher than the predetermined value 3 (Step S1107) When a determination of NO (the load operation time efficiency is lower than the predetermined value 3) is made in Step S1107, the abnormality determination section 202e finishes this flow.

When a determination of YES (the load operation time efficiency is equal to or higher than the predetermined value 3) is made in Step S1107, the abnormality determination section 202e determines that the load amount is detected as excessively high due to the abnormality of the load amount sensor 101a, excludes the productivity index calculated during this abnormality from the totalization processing, notifies the device maintenance person 304 that the load amount sensor 101a is to be calibrated or remotely instructs the mine dump truck 101 to calibrate the load amount sensor 101a (Step S1108), and finishes this flow.

With the processing described above, the load amount sensor 101a can be calibrated at the appropriate timing and the totalization/management of the productivity index based on inaccurate load amounts can be prevented by excluding, from the totalization processing, the productivity index in the cycle in which the load amounts are detected as excessively low/excessively high.

Figure 12:
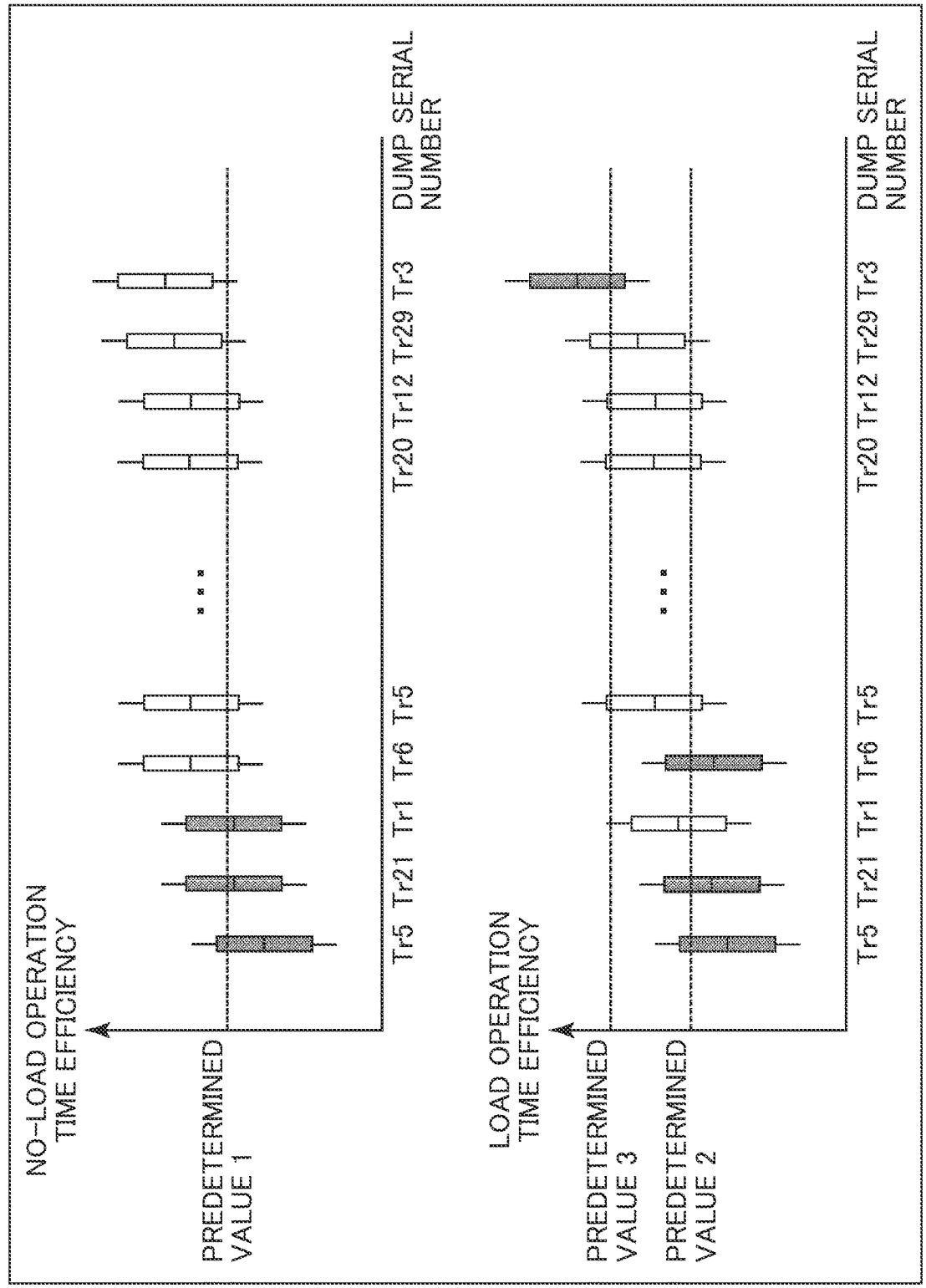
FIG. 12 is a graph for showing an display example of the no-load operation time efficiency and the load operation time efficiency totalized for each mine dump truck.

FIG. 12 is a graph for showing an display example of the no-load operation time efficiency and the load operation time efficiency totalized for each mine dump truck. In the example of FIG. 12, the no-load operation time efficiency and the load operation time efficiency in a predetermined period (for example, the last one week) are shown as box charts for each mine dump truck. It is possible to suppress influence of the driver and the travel path on the determination result by making the abnormality determination by using medians of the no-load operation time efficiency and the load operation time efficiency through the method described in FIG. 10 and FIG. 11 and more robust abnormality determination than that made in each cycle can be achieved.

In the example of FIG. 12, mine dump trucks having serial numbers Tr5, Tr21, and Tr1 have no-load operation time efficiency lower than the predetermined value 1 and hence are determined to have the powertrain system abnormality. Further, the mine dump truck having a serial number Tr1 has load operation time efficiency equal to or higher than the predetermined value 2 and hence is also determined to have the abnormality (excessively-high-value detection) of the load amount sensor 101a. The mine dump truck having a serial number Tr6 has no-load operation time efficiency equal to or higher than the predetermined value 1 and load operation time efficiency lower than the predetermined value 2 and hence is determined to have the abnormality (excessively-low-value detection) of the load amount sensor 101a. The mine dump truck having a serial number Tr3 has load operation time efficiency equal to or higher than the predetermined value 3 and hence is determined to have the abnormality (excessively-low-value detection) of the load amount sensor 101a. As shown in FIG. 12, the degrees of abnormality of the mine dump trucks 101 can be compared with one another by displaying the efficiency by state for the mine dump trucks 101 side by side and hence from which of the mine dump trucks 101 the calibration or the maintenance is started is easily determined when a plurality of mine dump trucks 101 are abnormal.

SUMMARY

In the present embodiment, the mine management system 200 for managing mine dump trucks 101 operating in the mine, includes the processing device 202 that calculates and totalizes the productivity index of the mine dump trucks 101, in which the processing device 202 calculates the consumed energy of the mine dump truck 101 on the basis of at least the vehicle velocity of the mine dump truck 101, the road surface gradient, and the load amount of the mine dump truck 101; calculate the input energy of the mine dump truck 101 on the basis of at least one of the fuel injection amount, the trolley electric power, and the battery electric power of the mine dump truck 101; and determine the presence or absence of the abnormality of the load amount sensor 101a or the powertrain system of the mine dump truck 101 on the basis of the consumed energy and the input energy.

According to the present embodiment configured as described above, the abnormality of the powertrain system and the load amount sensor 101a of the mine dump truck 101 can separately be sensed. As a result, when the abnormality of the powertrain system of the mine dump truck 101 is sensed, the productivity of the mine can be maintained/improved by executing maintenance/replacement of the powertrain system or reducing operation of this mine dump truck. Moreover, when the abnormality of the load amount sensor 101a is sensed, the productivity of the mine can accurately be managed by calibrating the load amount sensor 101a.

Moreover, the processing device 202 in the present embodiment: discriminates the state of the mine dump truck 101 on the basis of at least the vehicle velocity and the load amount of the mine dump truck 101; calculates the efficiency by state being the ratio of the consumed energy to the input energy for each state of the mine dump truck 101; and determines the presence or absence of the abnormality of the load amount sensor 101a or the powertrain system on the basis of the comparison result between the efficiency by state and the predetermined value. With this configuration, the presence or absence of the abnormality of the load amount sensor 101a or the powertrain system can be determined.

Moreover, the processing device 202 in the present embodiment adjusts the parameter (accessory electric power) used to calculate the consumed energy such that the efficiency by state falls within the predetermined range (I1 to I2) when the mine dump truck 101 is in the idling state. With this configuration, the robust abnormality determination against, for example, the change in the accessory electric power can be achieved.

Moreover, the processing device 202 in the present embodiment adjusts the parameter (road surface coefficient) used to calculate the consumed energy such that the efficiency by state falls within the predetermined range (R1 to R2) when the mine dump truck 101 is in the steady travel state. With this configuration, the robust abnormality determination against, for example, the change in the road surface coefficient can be achieved.

Moreover, the processing device 202 in the present embodiment determines that the load amount sensor 101a is abnormal when the efficiency by state at the time of the no-load operation of the mine dump truck 101 is lower than the first predetermined value (predetermined value 1) and the efficiency by state at the time of the load operation of the mine dump truck 101 is equal to or higher than the second predetermined value (predetermined value 2) or when the efficiency by state at the time of the no-load operation is equal to or higher than the first predetermined value (first predetermined value) and the efficiency by state at the time of the load operation is out of the predetermined range (the predetermined value 2 to the predetermined value 3). With this configuration, the abnormality of the load amount sensor 101a can be sensed on the basis of the efficiency by state at the no-load operation time and the load operation time of the mine dump truck 101.

Moreover, the processing device 202 in the present embodiment determines that calibration of the load amount sensor 101a is required when the processing device 202 determines that the load amount sensor 101a is abnormal. With this configuration, the load amount sensor 101a can be calibrated at the suitable time.

Moreover, the processing device 202 in the present embodiment excludes, from the totalization processing, the productivity index calculated in the period in which the processing device determines that the load amount sensor 101a is abnormal. With this configuration, the totalization/management of the productivity index based on inaccurate load amounts can be prevented.

Second Embodiment

Figure 13:
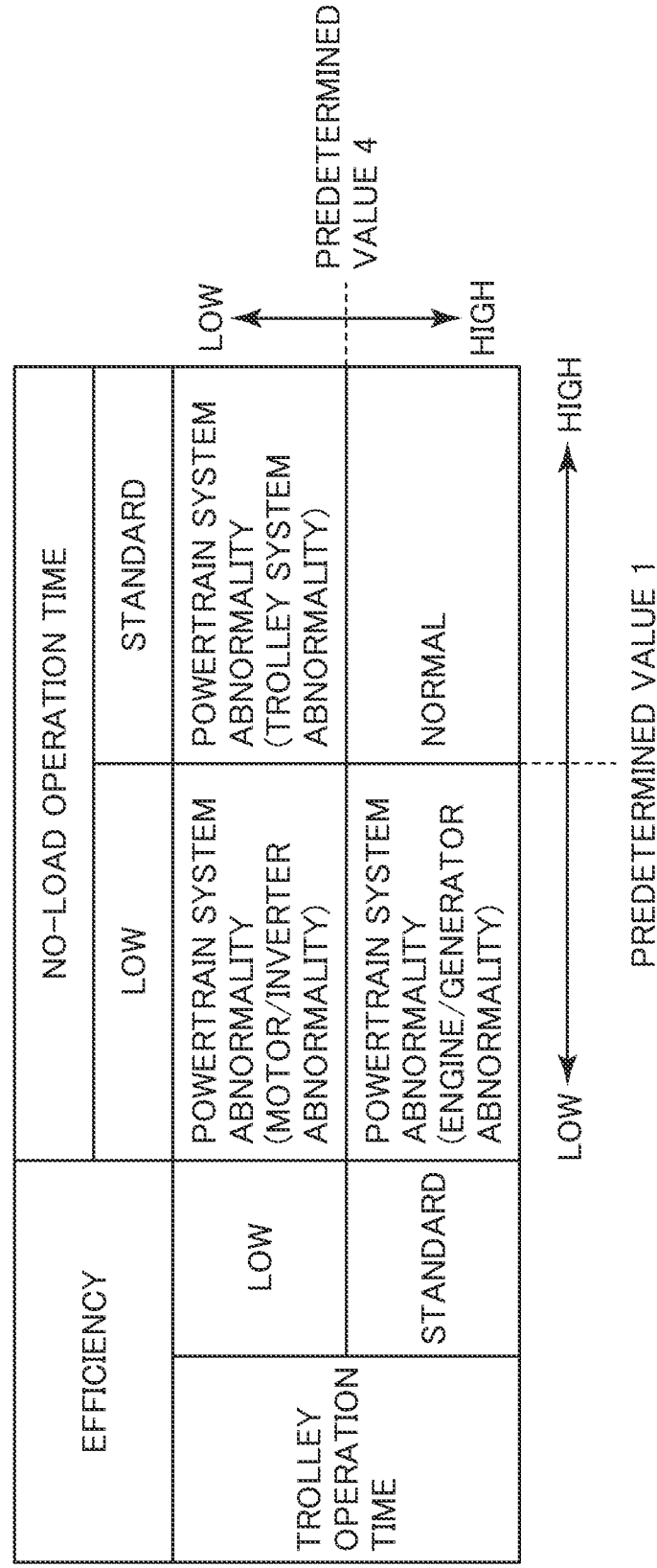
FIG. 13 is a table for showing an example of a relationship between efficiency at a no-load operation time and efficiency at a trolley operation time, and a powertrain system abnormality location.
Figure 14:
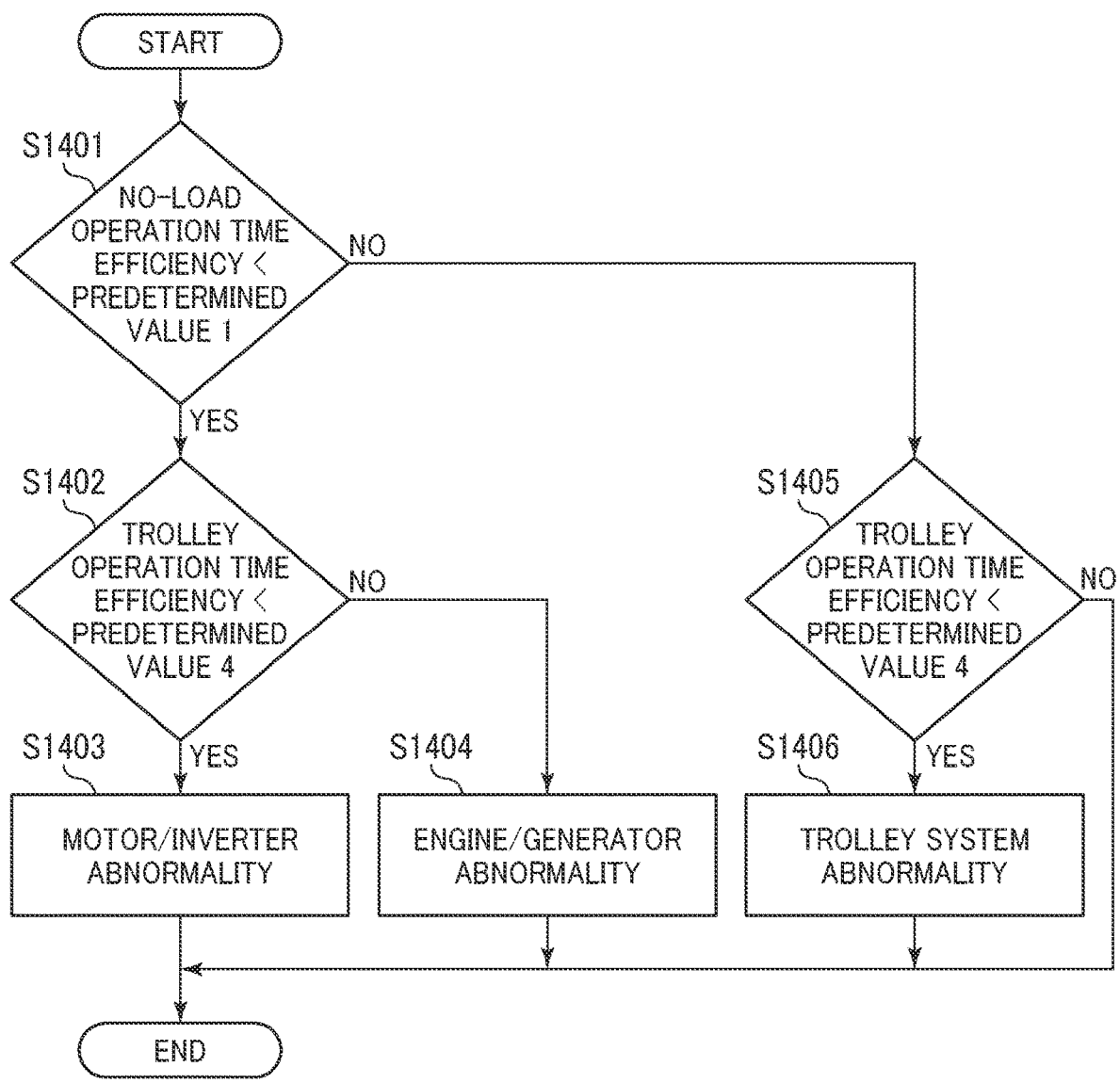
FIG. 14 is a flowchart for showing an example of processing executed when the abnormality determination section identifies an abnormal location in the powertrain system.
Figure 15:
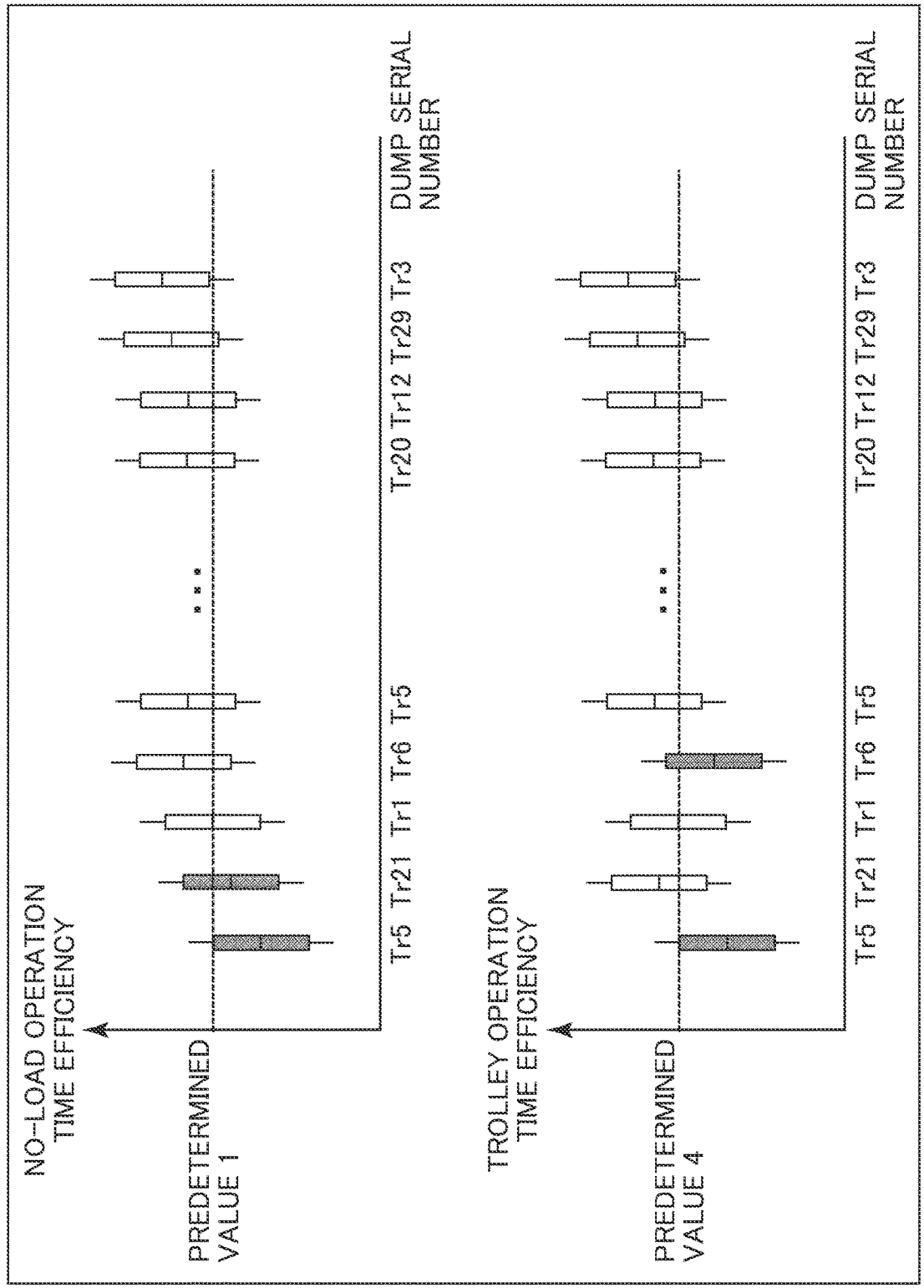
FIG. 15 is a graph for showing an display example of the no-load operation time efficiency and the trolley operation time efficiency totalized for each mine dump truck.

With reference to FIG. 13 to FIG. 15, a description is now given of the mine management system according to a second embodiment of the present invention. The configuration of the powertrain system assumed in the present embodiment is similar to the first embodiment (shown in FIG. 2A). Note that, in the present embodiment, a situation in which the abnormality of the load amount sensor 101a is not detected by the method described in the first embodiment is assumed.

FIG. 13 is a table for showing an example of a relationship between efficiency at the no-load operation time and efficiency at the trolly operation time, and a powertrain system abnormality location. As appreciated from the configuration of FIG. 2A, the efficiency by state in which the trolley electric power is received is hardly influenced by the engine and the generator. Thus, as shown in FIG. 13, the abnormality location of the powertrain system can be identified as any one of a trolley system, the engine/the generator, and the motor/the inverter by combining the determination of the efficiency by state at the trolley operation time with the determination of the efficiency by state at the no-load operation time.

In the present embodiment, the efficiency at the no-load operation time is determined to be low when the efficiency at the no-load operation time is lower than the predetermined value 1 (the minimum efficiency estimated at the no-load operation time) and the efficiency at the no-load operation time is determined to be standard when the efficiency at the no-load operation time is equal to or higher than the predetermined value 1. Moreover, the trolley operation time efficiency is determined to be low when the trolley operation time efficiency is lower than a predetermined value 4 (the minimum efficiency estimated at the trolley operation time) and the trolley operation time efficiency is determined to be standard when the trolley operation time efficiency is equal to or higher than the predetermined value 4. In a case in which the efficiency at the no-load operation time is low, the motor/the inverter is determined to be abnormal when the efficiency at the trolley operation time is low and the engine/generation system is determined to be abnormal when the efficiency at the trolley operation time is standard. In a case in which the efficiency at the no-load operation time is standard, the trolley system is determined to be abnormal when the efficiency at the trolley operation time is low and the powertrain system is determined to be normal when the efficiency at the trolley operation time is standard. As a result, locations to be investigated when the abnormality determination is made are limited, order of components in advance becomes easy, a recovery time from the abnormal state is reduced, and hence the productivity decrease due to the powertrain abnormality can quickly be resolved.

FIG. 14 is a flowchart for showing an example of processing executed when the abnormality determination section 202e identifies the abnormal location in the powertrain system. Each step is sequentially described now.

The abnormality determination section 202e first determines whether or not the efficiency at the no-load operation time (no-load operation time efficiency) is lower than the predetermined value 1 (Step S1401).

When a determination of YES (the no-load operation time efficiency is lower than the predetermined value 1) is made in Step S1401, the abnormality determination section 202e determines whether or not the efficiency at the trolley operation time (trolley efficiency) is lower than the predetermined value 4 (Step S1402).

When a determination of YES (the trolley efficiency is lower than the predetermined value 4) is made in Step S1402, the abnormality determination section 202e notifies the device maintenance person 304 of the abnormality of the motor/inverter (Step S1403) and finishes this flow. The fuel and the trolley electric power are consumed more at this abnormality time than at the normal time, and hence the abnormality determination section 202e may notify, for example, the operation planner 301 of such request information that a frequency to use the vehicle is reduced and the travel distance is reduced.

When a determination of NO (the trolley efficiency is equal to or higher than the predetermined value 4) is made in Step S1402, the abnormality determination section 202e notifies the device maintenance person 304 of the abnormality of the engine/generator (Step S1404) and finishes this flow. A fuel loss in the case of the supply of the electric power from the trolley system is slight at this abnormal time and hence the decrease in the productivity due to the abnormality can be suppressed to the minimum by urging the operation planner 301 to allocate this vehicle to a path on which the trolly is greatly used.

When a determination of NO (the no-load operation time efficiency is equal to or higher than the predetermined value 1) is made in Step S1401, the abnormality determination section 202e determines whether or not the trolley efficiency is lower than the predetermined value 4 (Step S1405). When a determination of NO (the trolley efficiency is equal to or higher than the predetermined value 4) is made in Step S1405, the abnormality determination section 202e finishes this flow.

When a determination of YES (the trolley efficiency is lower than the predetermined value 4) is made in Step S1405, the abnormality determination section 202e notifies the device maintenance person 304 of the abnormality of the trolley system (Step S1406) and finishes this flow. The portion other than the trolley system is normal at this abnormality time and hence a decrease in the productivity can be suppressed to the minimum by the operation planner 301 allocating this vehicle to a path on which the trolley is not used.

FIG. 15 is a graph for showing an display example of the no-load operation time efficiency and the trolley operation time efficiency totalized for each mine dump truck in a predetermined period. In the example of FIG. 15, the no-load operation time efficiency and the load operation time efficiency in the predetermined period (for example, the last one week) are shown as box charts for each mine dump truck. The abnormality determination is made by using medians of the no-load operation time efficiency and the load operation time efficiency through the method described in FIG. 13 and FIG. 14.

In the example of FIG. 15, the mine dump truck having a serial number Tr5 has the no-load operation time efficiency lower than the predetermined value 1 and the trolley operation time efficiency lower than the predetermined value 4 and hence is determined to have the motor/inverter abnormality. The mine dump truck having a serial number Tr21 has the no-load operation time efficiency lower than the predetermined value 1 and the trolley operation time efficiency equal to or higher than the predetermined value 4 and hence is determined to have the engine/generator abnormality. The mine dump truck having a serial number Tr6 has the no-load operation time efficiency equal to or higher than the predetermined value 1 and the trolley operation time efficiency lower than the predetermined value 4 and hence is determined to have the trolley system abnormality. As shown in FIG. 15, it is possible to recognize an abnormality occurrence state of all of the mine dump trucks 101 traveling in the mine by showing the efficiency by state of all of the mine dump trucks, the device maintenance person 304 can appropriately adjust a repairment execution plan, and the operation planner 301 can appropriately adjust a mine dump truck allocation plan. As a result, a decrease in productively can be suppressed to the minimum at the abnormality occurrence time.

With the present embodiment configured as described above, the failed location of the powertrain system of the mine dump truck 101 is identified and hence the productivity of the mine can be maintained by taking appropriate measures against this failed location.

Third Embodiment

Figure 16:
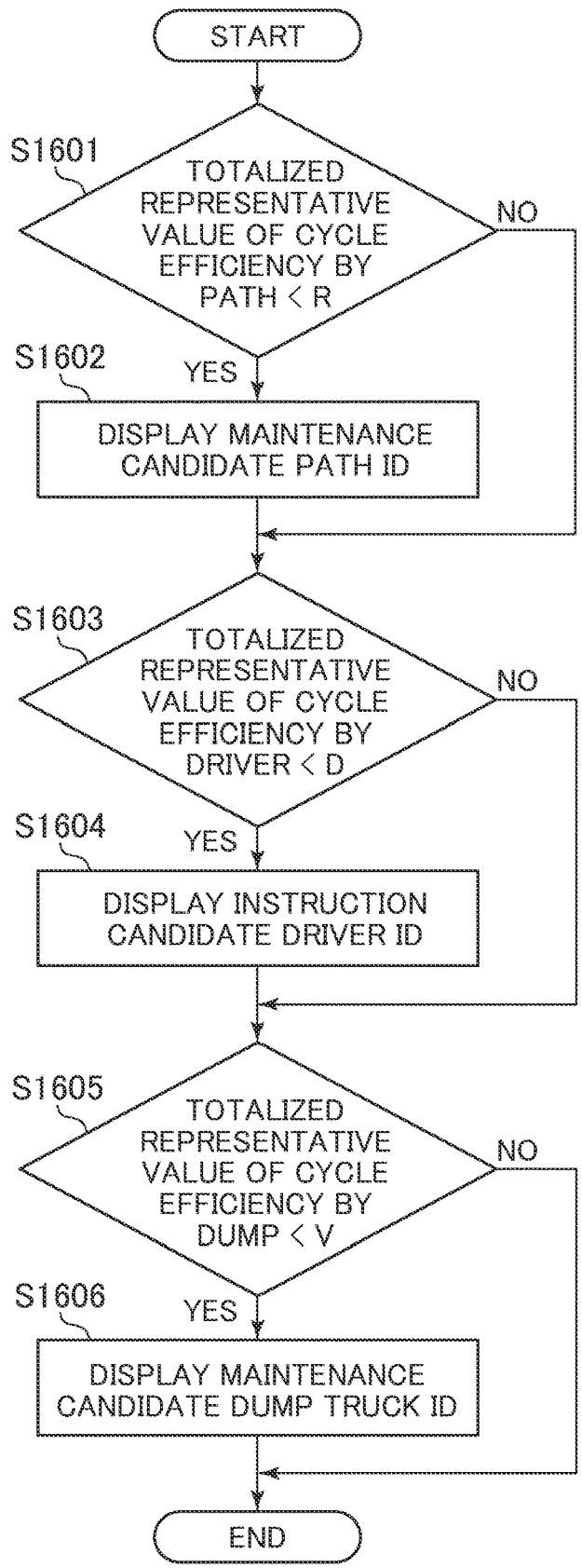
FIG. 16 is a flowchart for showing an example of processing executed when the processing device identifies a productivity decrease factor.
Figure 17:
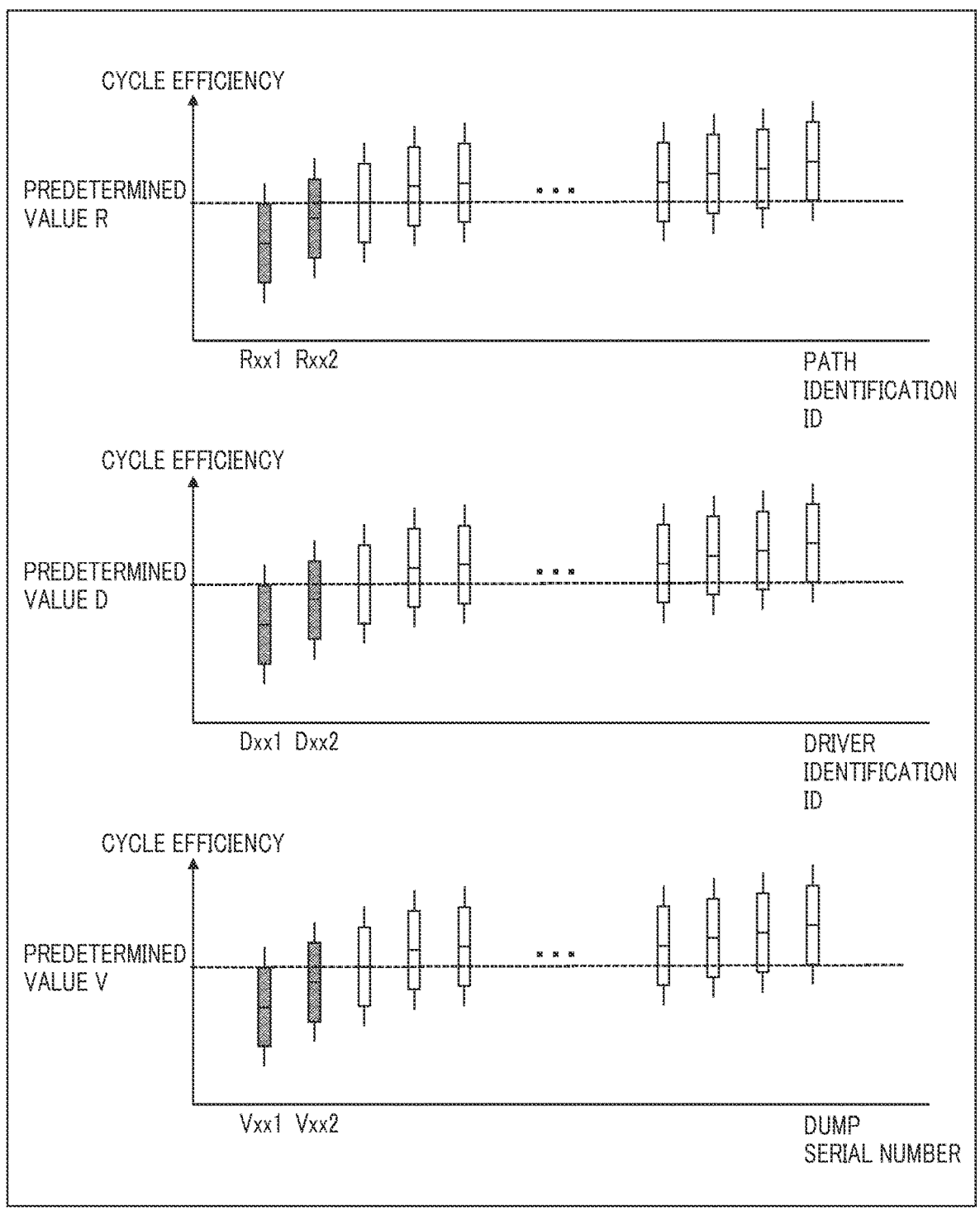
FIG. 17 is a graph for showing a display example of a cycle efficiency totalized for each path, each driver, and each mine dump truck.

With reference to FIG. 16 to FIG. 17, a description is given of the mine management system according to a third embodiment of the present invention. Note that, in the present embodiment, a situation in which the abnormality of the load amount sensor 101a is not detected by the method described in the first embodiment is assumed.

FIG. 16 is a flowchart for showing an example of processing executed when the processing device 202 identifies the productivity decrease factors. Each step is sequentially described now.

The processing device 202 totalizes, for each path, cycle efficiency calculated in each cycle and determines whether or not a totalized representative value (for example, a median or an average) is lower than a predetermined value R (Step S1601). As the predetermined value R, the minimum value of the cycle efficiency assumed on a corresponding path or the minimum value of the cycle efficiency assumed on a representative path may be set.

When the totalized representative value is determined to be lower than the predetermined value R (YES) in Step S1601, the processing device 202 causes the display terminal device 203 to display information (path ID) for identifying a path being a maintenance candidate (Step S1602). As a result, the road surface maintenance person 303 comes to be capable of maintaining this path and the operation planner 301 can review the operation plan such that the number of times of travel on this path is reduced.

When the totalized representative value is determined to be equal to or higher than the predetermined value R (NO) in Step S1601 or subsequently to Step S1602, the processing device 202 totalizes the cycle efficiency described before for each driver and determines whether or not the totalized representative value is lower than a predetermined value D (Step S1603). As the predetermined value D, it is only required to set the minimum value of the cycle efficiency assumed in advance.

When the totalized representative value is determined to be lower than the predetermined value D (YES) in Step S1603, the processing device 202 causes the display terminal device 203 to display information (driver ID) for identifying a driver having the cycle efficiency lower than the predetermined value D (Step S1604). As a result, the operator instructor 302 can provide the operation guidance to this driver.

When the totalized representative value is determined to be equal to or higher than the predetermined value D (NO) in Step S1603 or subsequently to Step S1604, the processing device 202 totalizes the cycle efficiency described before for each mine dump truck and determines whether or not the totalized representative value is lower than a predetermined value V (Step S1605). As the predetermined value V, it is only required to set the minimum value of the cycle efficiency assumed in advance. When a determination of NO (the totalized representative value is equal to higher than the predetermined value V) is made in Step S1605, the processing device 202 finishes this flow.

When a determination of YES (the totalized representative value is lower than the predetermined value V) is made in Step S1605, the processing device 202 causes the display terminal device 203 to display information (dump truck ID) for identifying a mine dump truck having the cycle efficiency lower than the predetermined value V (Step S1606) and finishes this flow. As a result, the device maintenance person 304 can maintain this mine dump truck.

FIG. 17 is a graph for showing a display example of the cycle efficiency totalized for each path, each driver, and each mine dump truck. It is possible to easily identify a path, a driver, or a mine dump truck 101 having low cycle efficiency by totalizing the cycle efficiency for each path, each driver, and each mine dump truck calculated in a predetermined period (for example, one week) and displaying the cycle efficiency arranged in an ascending order of the median. The totalized result to be displayed can optionally be changed, and, for example, only each piece of cycle efficiency having small medians may be displayed. Moreover, notification can be made to the road surface maintenance person 303, the operator instructor 302, or the device maintenance person 304 at an appropriate timing by simultaneously displaying the threshold values (predetermined values R, D, and V). Moreover, the path ID, the driver ID, and the dump truck ID may be associated with data representing an overall map of an operation site. When the path ID is taken as an example, the number of the path IDs is not limited to one and may be two or more. For example, when a plurality of paths to the same location exist, it is possible to simultaneously check the plurality of targets on the map and hence measures of selecting an optimal path ID of the displayed path IDs can be taken. When the driver ID is taken as an example and the number of drivers lower than the predetermined value D at any time is two or more, making notification altogether at once may be more efficient than making notification to each driver. Note that, the display of the path IDs, the driver IDs, and the dump truck IDs on the map may individually or altogether simultaneously be executed. Moreover, the display is executed not only in response to the instruction of the user, but also may optionally be changed, for example, at a timing set in advance, each time when a problem occurs, or in combination thereof. Moreover, the display order by the path, by the driver, and by the mine dump truck can optionally be changed and hence only desired targets may be displayed or the pieces of cycle efficiency may altogether be displayed at once. When the number of times of accumulation of the notification is a plurality of times, for example, twice or more, notification history and an analysis result (points to be improved/problems) in correspondence with this notification history may be displayed together. A form of the notification such as an electronic mail to a smartphone or sound does not matter as long as a target of the notification can check. As a result, it is possible to quickly remove a cause of the decrease in productivity.

SUMMARY

The processing device 202 in the present embodiment totalizes the efficiency by state for each path on which the mine dump truck travels and determines that the road surface of the path having the totalized representative value of the efficiency by state lower than the predetermined value R is abnormal. Moreover, the processing device 202 in the present embodiment totalizes the efficiency by state for each driver who drives the mine dump truck 101 and determines that the drive by the driver having the totalized representative value of the efficiency by state lower than the predetermined value D has a problem. Moreover, the processing device 202 in the present embodiment totalizes the efficiency by state for each mine dump truck 101 and determines that the mine dump truck 101 having the totalized representative value of the efficiency by state lower than the predetermined value R is abnormal.

With the present embodiment configured as described above, the cause of the decrease in productivity of the mine is identified and hence the productivity of the mine can be maintained by taking appropriate measures against this cause.

The embodiment of the present invention has been detailed but the present invention is not limited to the embodiment described above and includes various modification examples. For example, the embodiment described above is detailed for the sake of a easy-to-understand description of the present invention and the present invention is not necessarily limited to the embodiment including all the described configurations. Moreover, to the configurations of a certain embodiment, a part of the configurations of another embodiment may be added, and a part of the configurations of the certain embodiment may be removed or replaced by a part of another embodiment.

DESCRIPTION OF REFERENCE CHARACTERS

100: Mine area
101: Mine dump truck
101a: Load amount sensor
101b: Vehicle velocity sensor
102: Excavator
103: Bull dozer
200: Mine management system
201: Storage device
202: Processing device
202a: State determination section
202b: Input energy calculation section
202c: Consumed energy calculation section
202d: Efficiency-by-state calculation section
202e: Abnormality determination section
202f: Vehicle model calibration section
203: Display terminal device
301: Operation planner
302: Operator instructor
303: Road surface maintenance person
304: Device maintenance person
305: Mining responsible person
400: Internet

The invention claimed is:

1. A mine management system for managing mine dump trucks operating in a mine, comprising:
a processing device configured to calculate and totalize a productivity index of the mine dump trucks, wherein
the processing device is configured to:
calculate consumed energy of the mine dump truck on a basis of at least a vehicle velocity of the mine dump truck, a road surface gradient, and a load amount of the mine dump truck;
calculate input energy of the mine dump truck on a basis of at least one of a fuel injection amount, trolley electric power, and battery electric power of the mine dump truck; and
determine presence or absence of an abnormality of a load amount sensor or a powertrain system of the mine dump truck on a basis of the consumed energy and the input energy.

2. The mine management system according to claim 1, wherein
the processing device is configured to:
discriminate a state of the mine dump truck on a basis of at least the vehicle velocity and the load amount of the mine dump truck;
calculate efficiency by state being a ratio of the consumed energy to the input energy for each state of the mine dump truck; and
determine the presence or absence of the abnormality of the load amount sensor or the powertrain system on a basis of a comparison result between the efficiency by state and a predetermined value.

3. The mine management system according to claim 2, wherein
the processing device is configured to adjust a parameter used to calculate the consumed energy, such that the efficiency by state falls within a predetermined range when the mine dump truck is in an idling state.

4. The mine management system according to claim 2, wherein
the processing device is configured to adjust a parameter used to calculate the consumed energy, such that the efficiency by state falls within a predetermined range when the mine dump truck is in a steady travel state.

5. The mine management system according to claim 2, wherein
the processing device is configured to determine that the load amount sensor is abnormal when the efficiency by state at a time of a no-load operation of the mine dump truck is lower than a first predetermined value and the efficiency by state at a time of a load operation of the mine dump truck is equal to or higher than a second predetermined value or when the efficiency by state at a time of the no-load operation is equal to or higher than the first predetermined value and the efficiency by state at a time of the load operation is out of a predetermined range.

6. The mine management system according to claim 5, wherein
the processing device is configured to determine that calibration of the load amount sensor is required when the processing device determines that the load amount sensor is abnormal.

7. The mine management system according to claim 1, wherein
the processing device is configured to exclude, from totalization processing, the productivity index calculated in a period in which the processing device determines that the load amount sensor is abnormal.

8. The mine management system according to claim 2, wherein
the processing device is configured to totalize the efficiency by state for each path on which the mine dump truck travels and to determine that the road surface of the path having a totalized representative value of the efficiency by state lower than a predetermined value is abnormal.

9. The mine management system according to claim 2, wherein
the processing device is configured to totalize the efficiency by state for each driver who drives the mine dump truck and to determine that drive by the driver having a totalized representative value of the efficiency by state lower than a predetermined value has a problem.

10. The mine management system according to claim 2, wherein
the processing device is configured to totalize the efficiency by state for each mine dump truck and to determine that the mine dump truck having a totalized representative value of the efficiency by state lower than a predetermined value is abnormal.

* * * * *